US008682917B2

(12) United States Patent
Eskin

(10) Patent No.: US 8,682,917 B2
(45) Date of Patent: Mar. 25, 2014

(54) METHOD, SYSTEM AND COMPUTER PROGRAM PRODUCT FOR CURRENCY SEARCHING

(76) Inventor: Hank Eskin, Brookline, MA (US)

( * ) Notice: Subject to any disclaimer, the term of this patent is extended or adjusted under 35 U.S.C. 154(b) by 527 days.

(21) Appl. No.: 12/871,707

(22) Filed: Aug. 30, 2010

(65) Prior Publication Data

US 2012/0054224 A1    Mar. 1, 2012

(51) Int. Cl.
*G06F 17/30* (2006.01)

(52) U.S. Cl.
USPC .......................................... 707/758; 707/766

(58) Field of Classification Search
None
See application file for complete search history.

(56) References Cited

U.S. PATENT DOCUMENTS

| | | | | |
|---|---|---|---|---|
| 6,484,161 | B1* | 11/2002 | Chipalkatti et al. | 1/1 |
| 6,910,050 | B2 | 6/2005 | Pawlick | |
| 7,318,069 | B2 | 1/2008 | Takahashi et al. | |
| 2002/0072924 | A1 | 6/2002 | Gray | |
| 2002/0196147 | A1 | 12/2002 | Lau | |
| 2003/0214404 | A1 | 11/2003 | Thomas | |
| 2004/0028266 | A1* | 2/2004 | Jones et al. | 382/135 |
| 2005/0273365 | A1* | 12/2005 | Baumgartner et al. | 705/3 |
| 2006/0176216 | A1 | 8/2006 | Hipskind | |
| 2006/0218034 | A1* | 9/2006 | Kelly | 705/11 |
| 2007/0022096 | A1* | 1/2007 | Hertz | 707/3 |
| 2007/0088695 | A1* | 4/2007 | Bleyendaal et al. | 707/5 |
| 2007/0172106 | A1* | 7/2007 | Paraskevakos | 382/135 |
| 2008/0035722 | A1 | 2/2008 | Feld | |

OTHER PUBLICATIONS

"Wheres George—2.2 Screenshots," by Where's George? LLC (all screenshots taken from the Internet Archive Wayback Machine between Apr. 28, 2009 and Jun. 7, 2009) 9 pages. Original web address of main page: www.wheresgeorge.com. Way-back Machine address for main page: http://web.archive.org/web/20090607093950/http://www.wheresgeorge.com/.*
"Partial Results for Online Query Processing," by Raman & Hellerstein. IN: SIGMOD '02 (2002), pp. 275-286. Available at: ACM.*
"Mixed Numbers—Currency Serial Numbers," by Williams, Patrick (2004) (Way-back machine screenshot of Apr. 16, 2009). Available at: http://www.ischool.utexas.edu/~jpwms/mixednumbers/money.html.*
"Cut & Paste Popup date picker," by Gritcyuk, Denis (Apr. 16, 2009 screenshot provided by Way back machine) Available at: http://web.archive.org/web/20090416083310/http://javascriptkit.com/script/script2/timestamp.shtml? Original URL: http://www.javascriptkit.com/script/script2/timestamp.shtml.*
""Do you have this bill right now" Message," by TheRealDeal (2005) (hereinafter Message). Available at: http://forums.wheresgeorge.com/archive/index.php/t-18841.html.*

(Continued)

*Primary Examiner* — Daniel Kinsaul

(57) ABSTRACT

A method, system and computer program product includes transmitting over a network a user's request for a history of a currency bill. A serial number, a location, a date and an indication of possession is transmitted, where the serial number is used in a partial matching search, and mistaken alpha characters of the serial number are included in the partial matching search. First results of the partial matching search are received. Further identifying information is transmitted, where the identifying information is used in a matching search of the first results. Second results of the matching search are received. Additional information regarding the currency bill is transmitted for inclusion in the database where the indication of possession at least, in part, determines entries. A notification request of a next finding of the currency bill is transmitted, where registration of the user is verified. The history of the currency bill is received.

21 Claims, 24 Drawing Sheets

(56) References Cited

OTHER PUBLICATIONS

"Money Circulation, Tracking Items, and the Emergence of Universal Human Mobility Patterns," by Brockman and Theis. IN: Pervasive Computing (2008). Available at: IEEE.*

"Anomalous Diffusion in Gibbsian-Breaking of Wealth Distributions," by Abdullah & Khidzir. IN: Malaysian Journal of Science 29 (2) pp. 167-173 (May 2010). Available at: http://www.myjurnal.my/filebank/published_article/13851/MJS_Vol_29_2_167_173_Anomalous_Diffusion_in_Gibbsian_Breaking.pdf.*

"Don't Panic," by Control Medicine. IN: Emerging & Technology (Jun. 2009). Available at: IEEE.*

"PHP Form Validation," by Till (May 20, 2008). Available at: http://www.htmlcenter.com/blog/php-form-validation/.*

"The National Archives—Access to Archival Database," (Screenshots provided for first page from WayBack machine of Oct. 5, 2006). Available at: http://aad.archives.gov/aad/fielded-search.jsp?dt=893 Wayback machine: http://web.archive.org/liveweb/http://aad.archives.gov/aad/fielded-search.jsp?dt=893&cat=SB 816&tf=F&bc=sb,sl.*

* cited by examiner

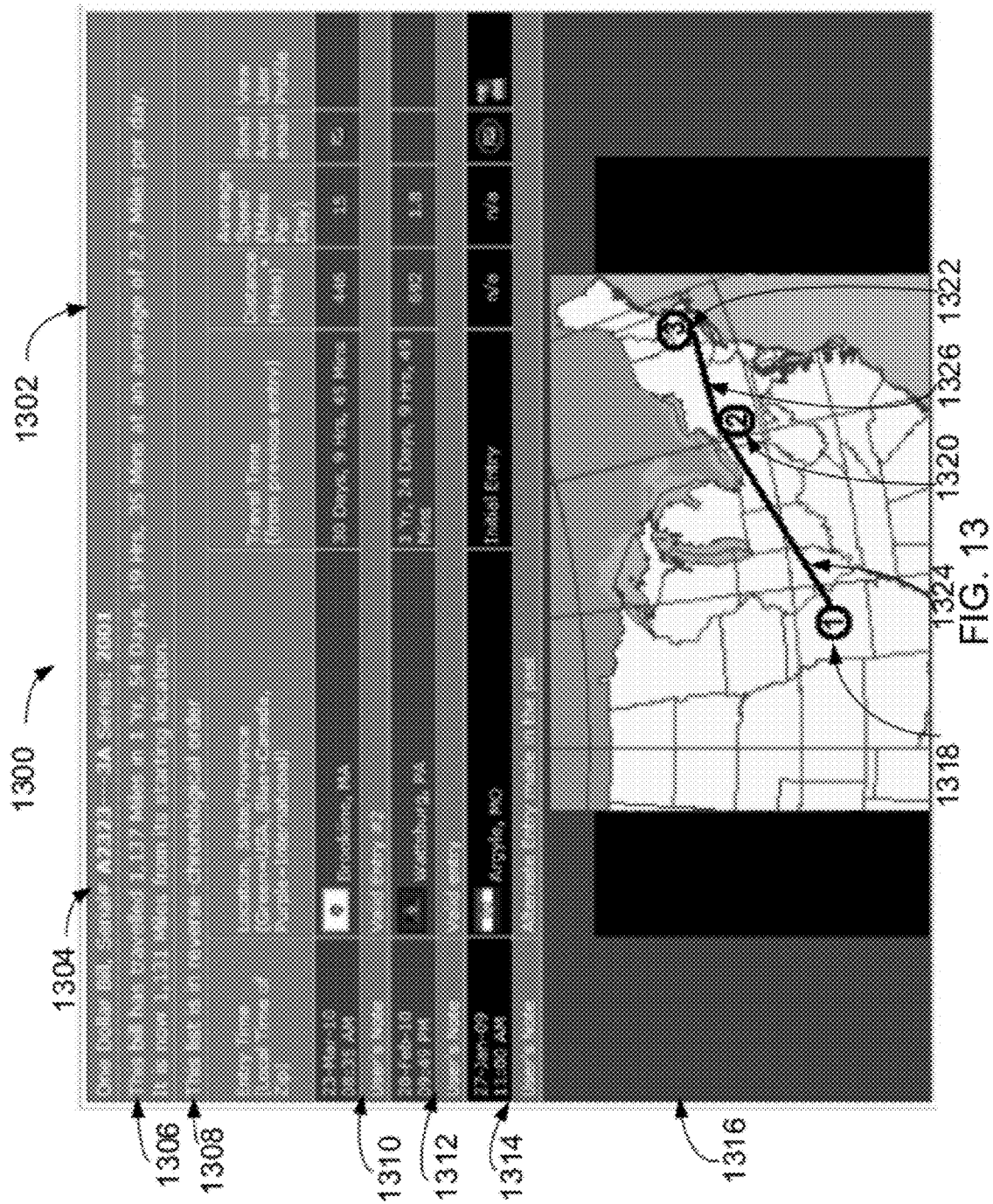

METHOD, SYSTEM AND COMPUTER PROGRAM PRODUCT FOR CURRENCY SEARCHING

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to the field of computer supported networked social interaction websites. More particularly, the invention relates to sovereign currency searching and tracking.

BACKGROUND OF THE INVENTION

Graphical User Interfaces (GUI) may be provided with many different styles and operational behaviors. When faced with a frustrating and difficult to use GUI, many users elect not to return, resulting in low customer conversion and retention rates. Decreasing a user's frustration and confusion when interfacing with a GUI may improve rates for customer conversion, retention and satisfaction. Improving customer satisfaction with regard to GUI interactions may significantly improve brand awareness and profitability.

An example of a frustration which a user may experience with regard to an interaction with a GUI is being required to register or login as a user at an inconvenient moment in time. An untimely GUI interaction may cause a user to lose his train of thought and as a result become distracted and/or become annoyed. GUIs may also complicate the interaction of a user by funneling a user with different goals from other users through the same execution path, and as a result may require a user to perform unnecessary efforts and tasks which may not be related to the user's specific goals but to the goals of other users. GUIs may also complicate and increases times for interaction by requiring a user to enter information with several different displays of information, instead of presenting the user with a streamlined, uncomplicated, efficient and easy to use interface. Another example of a difficulty a user may experience in interfacing with a GUI is requiring the user to enter information which may be unnecessary or secondary for completing the task at hand. Additionally, a user may be unnecessarily required to enter information by a GUI for which it may be possible to derive the information from other entered information or from a combination of entered information and archived information. Also, when interfacing with a GUI, a user may enter incomplete, erroneous and/or unsupported information and as a result the entire record of information entered by user may be rejected, discounted or ignored, even though some of the information which was entered may have been valid, accurate and even useful.

Currency tracking Internet websites operate to allow its users to initiate tracking of currencies in their possession. For example, after marking a currency and entering a record of information for the currency to the currency tracking website, a user may be able to track future locations and statistics related to the travels of the currency as other users find the currency and add records of information related to the currency's geographic location, date and time. Additionally, persons finding marked currencies may use currency tracking websites to analyze the geographic travels and statistics for currency notes which they find in their possession.

The physical description and design of sovereign currencies can be complicated. The complications are often added by sovereign nations in order to thwart counterfeiters or currency. Attempting to find a certain feature of a currency note can be difficult due to the complicated nature of a bill's design, features and structure. For example, a currency note may have a security thread, micro-printed text, intricate color scheme, portrait, denomination, serial number, signatures, series identifier, watermarks, seals emblems and symbols. The complex design of sovereign currencies can result in frustrations for users of currency tracking websites attempting to find information located on the currencies which may be required by the websites in order to support searching and tracking currency notes.

FIG. 1 illustrates a conventional display of information as viewed by a user on a GUI for a currency tracking Internet website.

An information display 100 includes a display area 102, a denomination selection input 104, a bill series selection input 106, a serial number input 108, a zip code input 110, a possession radio selection 112, a text input 114 and a submit selection 116.

Display area 102 may operate to display information to user (not shown). Non-limiting examples of information which may be displayed include text, graphics, input selections, text inputs, selection boxes, radio selections and submit selections.

Denomination selection input 104 may operate to receive a selection for the denomination of the currency to be analyzed. Non-limiting examples of denominations which may be selected include $1, $2, $5 $10, $20, $50, and $100. Bill series selection input 106 may operate to receive a selection for the series of the currency to be analyzed. Non-limiting examples of bill series which may be selected include 2006, 2003A, 2003, 2009, 2001, 1999, 1995, 1993, 1988, 1988A, 1985, 1981, 1981A, 1977, 1977A, 1974, 1969, 1969A-D, 1963A-B and 1963. Zip code input 110 may operate to receive a zip code indicating the geographic location of the currency. Possession radio selection 112 may operate to allow a user to select whether the currency being analyzed may currently be in the user's possession or not. Text input 114 may operate to allow a user to input textual information related to a currency note in order for the bill to be analyzed and processed. Non-limiting example of information which may be entered into text input 114 includes location and condition of currency. Submit selection 116 may operate to allow user to signal when information entered or selected in information display 100 has been completed.

FIG. 1 illustrates how a conventional GUI may initially request a multiplicity of information from a seeker, and which some of the information may have been unnecessarily requested in relation to finding, analyzing and processing information for a currency note.

FIG. 2 illustrates a block diagram depicting a conventional regionalized client/server communication system which may be used by an exemplary web-enabled/networked embodiment or embodiments of the present invention.

A communication system 200 includes a multiplicity of networked regions with a sampling of regions denoted as a network region 202 and a network region 204, a global network 206 and a multiplicity of servers with a sampling of servers denoted as a server device 208 and a server device 210.

Network region 202 and network region 204 may operate to represent a network contained within a geographical area or region. Non-limiting examples of representations for the geographical areas for the networked regions may include postal zip codes, telephone area codes, states, counties, cities and countries. Elements within network region 202 and 204 may operate to communicate with external elements within other networked regions or within elements contained within the same network region.

In some implementations, global network 206 may operate as the Internet. It will be understood by those skilled in the art that communication system 200 may take many different forms. Non-limiting examples of forms for communication system 200 include local area networks (LANs), wide area networks (WANs), wired telephone networks, cellular telephone networks or any other network supporting data communication between respective entities via hardwired or wireless communication networks. Global network 206 may operate to transfer information between the various networked elements.

Server device 208 and server device 210 may operate to execute software instructions, store information and communicate with other networked elements. Non-limiting examples of software and scripting languages which may be executed on server device 208 and server device 210 include PHP, Perl, C, C++, C# and Java.

Network region 202 may operate to communicate bi-directionally with global network 206 via a communication channel 212. Network region 204 may operate to communicate bi-directionally with global network 206 via a communication channel 214. Server device 208 may operate to communicate bi-directionally with global network 206 via a communication channel 216. Server device 210 may operate to communicate bi-directionally with global network 206 via a communication channel 218. Network region 202 and 204, global network 206 and server devices 208 and 210 may operate to communicate with each other and with every other networked device located within communication system 200.

Server device 208 includes a networking device 220 and a server 222. Networking device 220 may operate to communicate bi-directionally with global network 206 via communication channel 216 and with server 222 via a communication channel 224. Server 222 may operate to execute software instructions and store information.

Network region 202 includes a multiplicity of clients with a sampling denoted as a client 226 and a client 228. Client 226 includes a networking device 234, a processor 236, a GUI 238 and an interface device 240. Non-limiting examples of devices for GUI 238 include monitors, televisions, cellular telephones, smartphones and PDAs (Personal Digital Assistants). Non-limiting examples of interface device 240 include pointing device, mouse, trackball, scanner and printer. Networking device 234 may communicate bi-directionally with global network 206 via communication channel 212 and with processor 236 via a communication channel 242. GUI 238 may receive information from processor 236 via a communication channel 244 for display to a user for viewing. Interface device 240 may operate to send control information to processor 236 and to receive information from processor 236 via a communication channel 246. Network region 204 includes a multiplicity of clients with a sampling denoted as a client 230 and a client 232. Client 230 includes a networking device 248, a processor 250, a GUI 252 and an interface device 254. Non-limiting examples of devices for GUI 238 include monitors, televisions, cellular telephones, smartphones and PDAs (Personal Digital Assistants). Non-limiting examples of interface device 240 include pointing devices, mousse, trackballs, scanners and printers. Networking device 248 may communicate bi-directionally with global network 206 via communication channel 214 and with processor 250 via a communication channel 256. GUI 252 may receive information from processor 250 via a communication channel 258 for display to a user for viewing. Interface device 254 may operate to send control information to processor 250 and to receive information from processor 250 via a communication channel 260.

For example, consider the case where a user interfacing with client 226 may want to operate to track a currency note using information display 100 (FIG. 1). A user may enter the IP (Internet Protocol) address for information display 100 using interface device 240. The IP address information may be communicated to processor 236 via communication channel 246. Processor 236 may then communicate the IP address information to networking device 234 via communication channel 242. Networking device 234 may then communicate the IP address information to global network 206 via communication channel 212. Global network 206 may then communicate the IP address information to networking device 220 of server device 208 via communication channel 216. Networking device 220 may then communicate the IP address information to server 222 via communication channel 224. Server 222 may receive the IP address information and after processing the IP address information may communicate display information to networking device 220 via communication channel 224. Networking device 220 may communicate the display information to global network 206 via communication channel 216. Global network 206 may communicate the display information to networking device 234 via communication channel 212. Networking device 234 may communicate the display information to processor 236 via communication channel 242. Processor 236 may communicate the display information to GUI 238 via communication channel 244. User may then view information display 100 (FIG. 1) on GUI 238. Using interface device 240, user may enter information for display area 102 (FIG. 1) by selecting an appropriate denomination for denomination selection input 104 (FIG. 1), an appropriate bill series for bill series selection input 106 (FIG. 1), an appropriate serial number for serial number input 108 (FIG. 1), an appropriate zip code for zip code input 110 (FIG. 1), an appropriate selection for possession radio selection 112 (FIG. 1) and appropriate text information for text input 114 (FIG. 1). User may enter the zip code of the geographic region describing network region 202, as geographic location for client 226 may be within network region 202. Using interface device 240, user may then select submit selection 116 (FIG. 1) to communicate the information to server 222 in the same manner as previously discussed. Server 222 may receive the information and process it accordingly. After processing, server 222 may transmit new display information to GUI 238 for user to view using a similar process as previously described. Non-limiting examples of information transmitted to GUI 238 include affirmation of finding information for the currency, requests for more information regarding the currency, requests for user account information and requests for user to create an account. The process for the software, executing on server 222, requesting additional information and user supplying additional information in response, may be repeated several times in order for a final resolution to be determined for the currency note. In many cases, the repeated process of the software executing on server 222 requesting additional information from a user may cause user to give up on receiving final resolution for tracking the currency. Additionally the software executing on server 222 may operate to request unnecessary information for tracking currencies and as a result needlessly frustrate users. Furthermore, the software executing on server 222 may operate to interfere with a user's train of thought by requesting the user enter information for logging in at inopportune moments of time. Furthermore, user may enter partially erroneous information resulting in the software executing on server 222 rejecting the user entry, although some of the information entered by the user was valid, correct and potentially useful.

In view of the foregoing, there is a need for improved techniques for providing GUIs for currency tracking websites.

BRIEF DESCRIPTION OF THE DRAWINGS

The present invention is illustrated by way of example, and not by way of limitation, in the figures of the accompanying drawings and in which like reference numerals refer to similar elements and in which:

FIG. 13 illustrates a display of information as viewed by a user on a GUI for an exemplary web-enabled/networked embodiment of the present invention;

Figure 1:
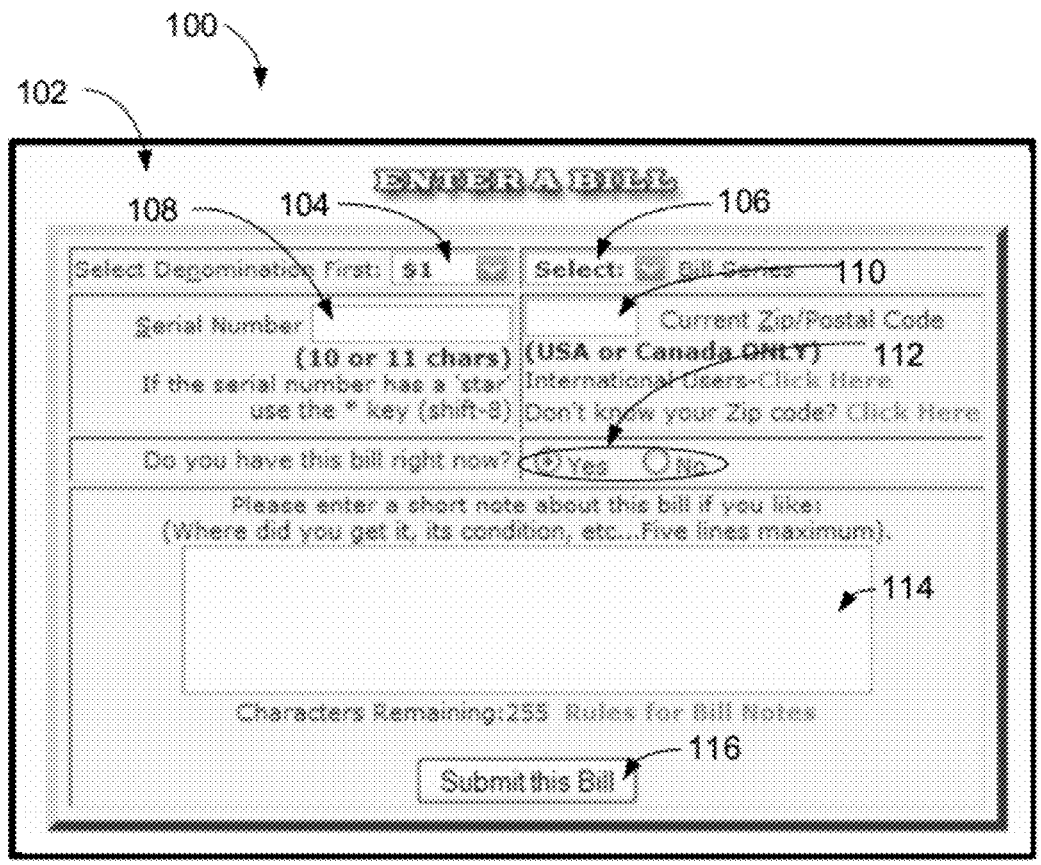
FIG. 1 illustrates a conventional display of information as viewed by a user on a GUI for a currency tracking Internet website.

Unless otherwise indicated illustrations in the figures are not necessarily drawn to scale.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

A first embodiment of the present invention will be described which provides means and methods for segregating users into searchers and trackers. Searchers and trackers have different goals for their interaction with currency searching/tracking websites. Trackers typically have in their possession an unmarked currency note and may be seeking to initiate tracking of the bill, while in contrast searchers may have in their possession a marked currency note and may be seeking information related to the marked currency note. Searchers may have received a marked currency note with the marking information presenting information related to a currency searching/tracking website. Furthermore, searchers may be seeking to determine information related to the marked currency note and may be seeking to determine the future and past travels and other related information related to a currency note. Trackers may be seeking to determine the future travels and other related information for a currency note. Trackers and searchers may select to be notified when a new entry may have been entered for a currency note for which they may be seeking to track. Non-limiting examples of methods for which trackers and searchers may select to be notified in the event of any new information entered for a currency note include email and text messages, notifications on social networking sites 'status updates' or 'tweets', etc. Non-limiting examples of information trackers and searchers may be seeking to determine for a currency note include distance traveled since tracking initiated, time elapsed since tracking initiated, average distance per unit of time, dates of entry by other users, locations of other users, elapsed time between other user's entries, distance traveled between other user's entries, profile of other users and maps illustrating travel of a currency note. Non-limiting examples of profile information for users may include name, location/city, age, gender, user statistics (number of bills entered, number of bills hit, hit rate, personal website link, site score, etc) and social network websites. By presenting a distinct and tailored series of GUIs to searchers and a distinct and tailored series of GUIs to trackers, the interaction required by searchers and trackers for interfacing with currency searching/tracking websites may be reduced and streamlined. Searcher interaction may be simplified by requesting users initially enter a serial number for a currency note instead of requesting a multiplicity of information related to the currency note. Non-limiting examples of other information which may not be requested include denomination and series. In order to reduce interaction efforts which may be required by searchers, a serial number for the currency note may be requested without requesting searchers provide other additional information. A partial matching search of the database can then be done. For cases where more than one currency note may be found for a serial number, user may be presented with a list of potentially matching currency notes and other related information for aiding users in selecting a match. In order to reduce user frustration and confusion, aid may be provided in resolving issues related to mistaken identities for alpha characters. The alpha character "C" located in the serial number of a currency note may be easily mistaken for the alpha character "G" and vice-versa. In cases where a match may not be found for a serial number, an operation may be performed to search for entries which may have a mistaken identity with respect the alpha characters "C" and "G" and prompt users with a list of potential entries for aiding them in resolving misunderstandings related to alpha characters "C" and "G" and for aiding them in finding a match. In other alternative embodiment, the alpha characters of the serial number may be omitted and the partial search conducted using only the numeric of the serial number.

In other embodiments of the present invention, a method and means will be described for providing support for tracking currency notes for which a user may have past, previous or historical possession of a currency note. For example, a user may opt to enter information for tracking a currency note for which user may no longer be in possession and may enter information related to the prior possession of the currency note. Non-limiting examples of information user may enter related to prior possession of a currency note may include date of prior possession, location of prior possession and serial number of currency note in prior possession.

In other embodiments of the present invention, a method and means for providing support for alternate entries will be described. An alternate entry for a currency note may not qualify as "natural circulation" and instead of rejecting the currency note, the currency note may be tracked, but in a different manner than currency notes which may not be considered alternate. Non-limiting examples of alternate entries include a violation of the rules for interaction and currency notes no longer in a user's possession, currency notes exchanged between two users, or a single user finding and re-entering their own currency note. Alternate entry currency notes may be denoted in displayed reports as alternate.

In other embodiments of the present invention, a method and means for providing support for in-line user registration will be described. In order to reduce, simplify and streamline interaction efforts required by users, information requested for accessing an account may be requested as needed and in conjunction with requests for other information.

In various other embodiments, teachings of the present invention may be applied to various other types of search. Non-limiting examples include credit card numbers, bar codes, vehicle identification numbers (VIN codes), social security numbers (SSNs), automobile license plates, etc. In view of the following descriptions, it will be readily apparent, to one skilled in the art, that teaching of the present invention may be applied to tracking virtually any currency, from any country, having at least a unique serialization.

Figure 3:
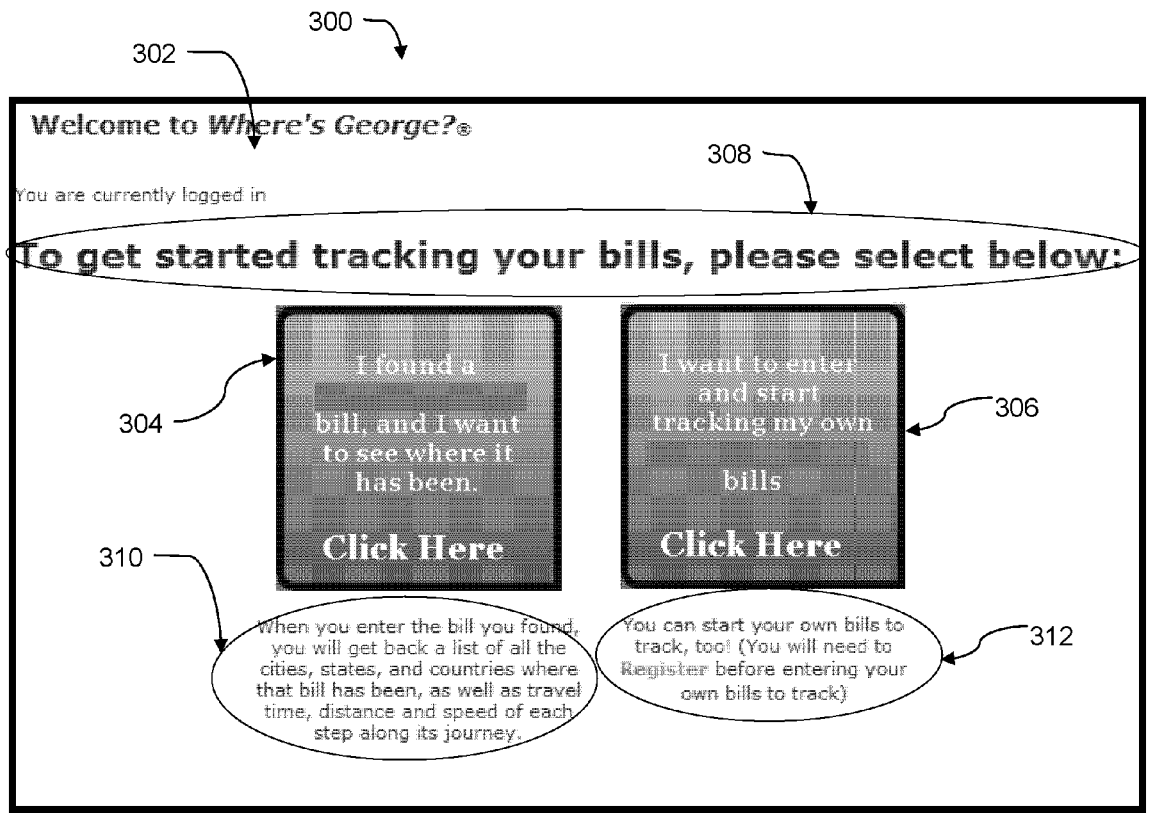
FIG. 3 illustrates a display of information as viewed by a user on a GUI for an exemplary web-enabled/networked embodiment of the present invention.

FIG. 3 illustrates a display of information as viewed by a user on a GUI for an exemplary web-enabled/networked embodiment of the present invention.

An information display 300 includes a display area 302, a searching select 304, a tracking select 306, a text area 308 and text areas 310 and 312.

Display area 302 may operate to display information to a user (not shown). Non-limiting examples of information which may be displayed include text, graphics, input selections, text inputs, selection boxes, radio selections, continue selections and submit selections. Searching select 304 may operate to allow a user to signal they have found currency which user seeks to determine the currency's previous location, date/time and other information. Non-limiting examples of other information user may be seeking include distance traveled, times of travel, average speed of travel, profile for users making entries and geographical location where entries may have been performed. Tracking select 306 may operate to allow a user to signal they seek to enter information for a currency note user may desire to track. Text area 308 may operate to encourage user to select either searching select 304 or tracking select 306. Text area 310 may operate to inform user of the results following selecting searching select 304. Text area 312 may operate to inform user of the results following selecting searching select 306. Text area 310 may inform user that if the currency note selected for tracking in the following steps had been entered before, then user may be provided with a list of information related to the currency. Non-limiting examples of information which may be displayed for the currency include geographic region, date, time, travel time, distance traveled and speed of travel. Text area 312 may also inform user that they can track (start) their own currency, although following this step requires user registration. Display area 302 may also operate to display other additional information. Non-limiting examples of other information which display area 302 may present include selection links, selection link for displaying an example of a bill tracking report and selection link for being logged in as an incorrect user. A user opting to select a selection link may be displayed information related to the selection link, i.e., the display information viewed by user on user's GUI may transition to a new display of information or may display a smaller window with information related to the selection link.

FIG. 3 illustrates how searchers and trackers may be segregated in order to present users with a streamlined and efficient interaction.

Figure 4:
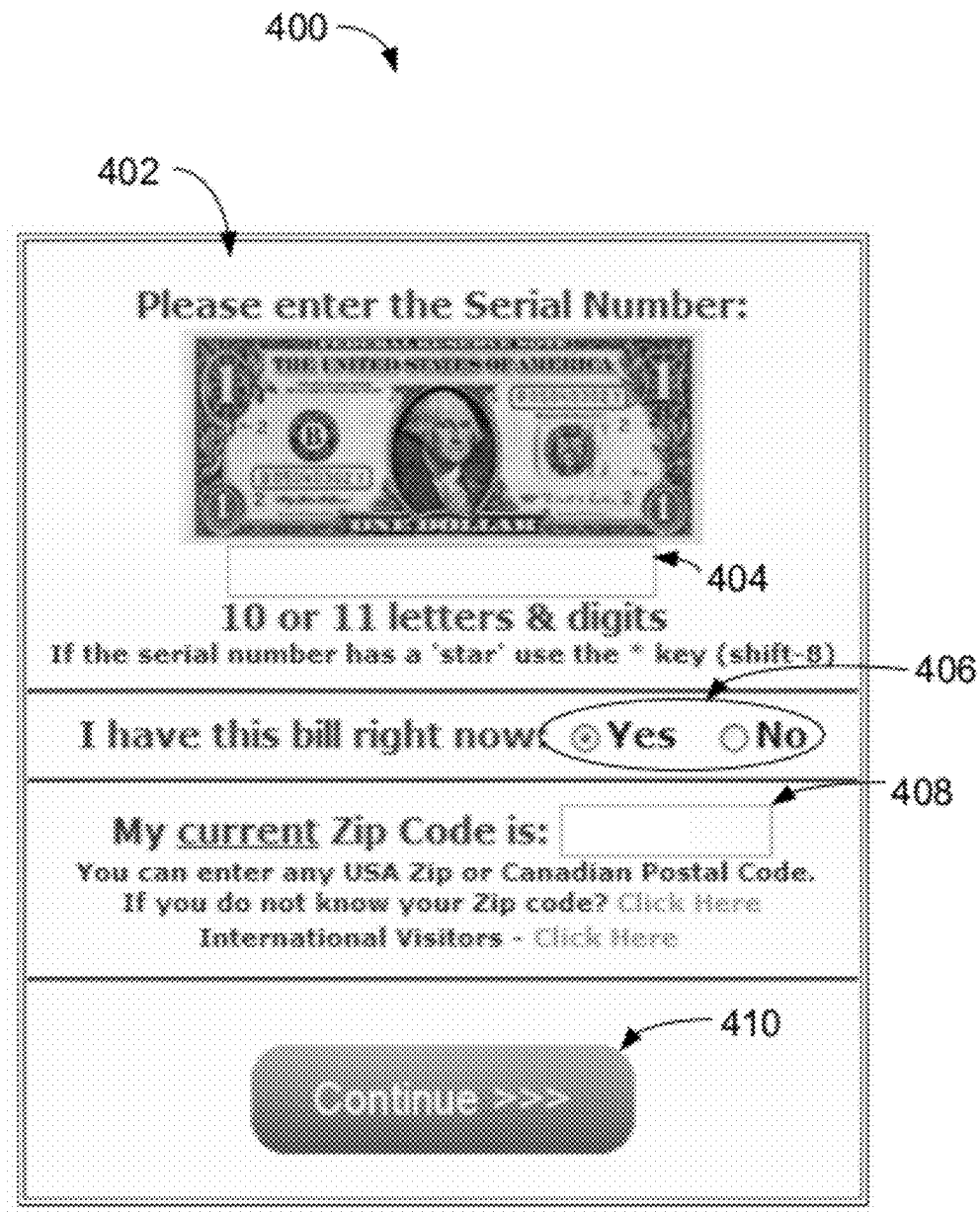
FIG. 4 illustrates a display of information as viewed by a user on a GUI for an exemplary web-enabled/networked embodiment of the present invention.

FIG. 4 illustrates a display of information as viewed by a user on a GUI for an exemplary web-enabled/networked embodiment of the present invention.

An information display 400 includes a display area 402, a serial number input 404, a possession radio selection 406, a zip code input 408 and a continue select 410. In some embodiments of the present invention, display area 402 operates to provide an example of a currency note with circles indicating locations for the serial number. In further embodiments, when a user clicks on the depicted currency note, the image changes to a different denomination with the locations of the serial number indicated.

Display area 402 may operate to display information to a user (not shown). Non-limiting examples of information which may be displayed include text, graphics, input selections, text inputs, selection boxes, radio selections, continue selections and submit selections. Serial number input 404 may operate to allow a user to input the serial number for a currency note. Possession radio selection 406 may operate to allow a user to indicate whether user may be currently in possession of the currency note for the serial number entered in serial number input 404 or not. Zip code input 408 may allow a user to indicate user's current geographic location. Continue select 410 may operate to allow a user to indicate when user has completed entering information for serial number input 404, possession radio selection 406 and zip code input 408. Display area 402 may also display other additional information. Non-limiting examples of other information which display area 402 may present include selection links, directions for entering serial number, directions for entering 10 or 11 alphanumeric letters and digits, directions for serial numbers containing stars, information clarifying the countries for which zip codes may be entered, selection link for a user not knowing user's current zip code and selection link for international users.

FIG. 4 illustrates the reduced amount of initial information related to a currency note requested by a searcher over the amount of initial information requested by conventional methods and means as illustrated in FIG. 1.

Figure 5A:
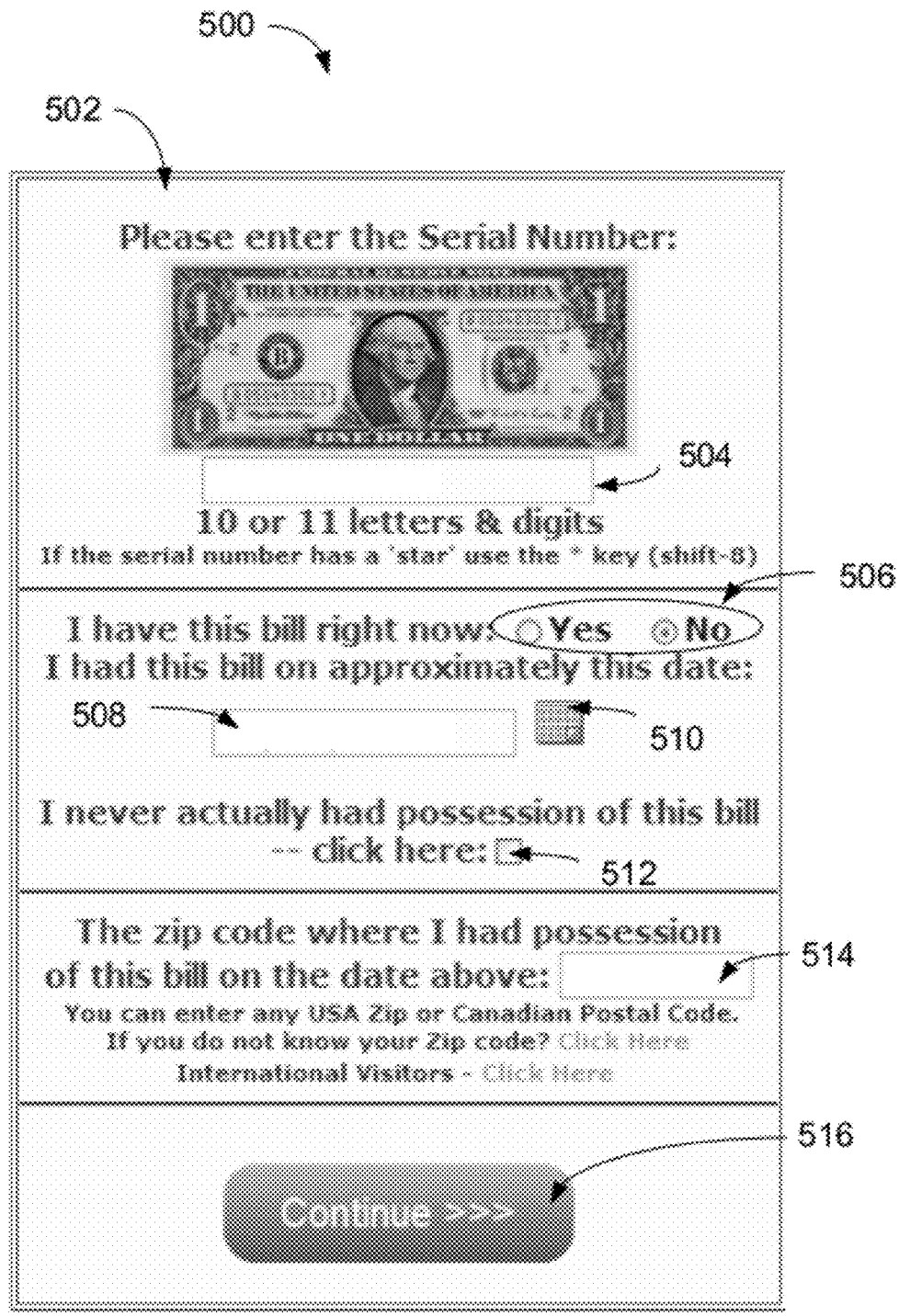
FIG. 5A-B illustrates a display of information as viewed by a user on a GUI for an exemplary web-enabled/networked embodiment of the present invention.

FIG. 5A illustrates a display of information as viewed by a user on a GUI for an exemplary web-enabled/networked embodiment of the present invention.

An information display 500 includes a display area 502, a serial number input 504, a possession radio selection 506, a possession date input 508, a calendar selection link 510, a no possession checkbox input 512, a zip code input 514 and a continue select 516.

Display area 502 may operate to display information to a user (not shown). Non-limiting examples of information which may be displayed include text, graphics, input selections, text inputs, selection boxes, radio selections, continue selections and submit selections. Serial number input 504 may operate to allow a user to input the serial number for a currency note. Possession radio selection 506 may operate to allow a user to indicate whether user may be currently in possession of the currency note as entered for serial number input 504 or not. Possession date input 508 may operate to allow user to enter a date of possession. Calendar selection link 510 may operate to allow user to be presented with a calendar for selecting date of possession and the capability to select a date of possession for insertion into possession date input 508. No possession checkbox input 512 may operate to allow a user to indicate whether the currency note for analysis has ever been in user's possession or not. Zip code input 514 may allow a user to indicate their current geographic location when in possession of currency note as indicated by serial number entered in serial number input 504. Continue select 516 may operate to allow a user to indicate when user has completed entering information for serial number input 504, possession radio selection 506, possession date input 508, calendar selection link 510, no possession checkbox input 512 and zip code input 514. Display area 502 may also display other additional information. Non-limiting examples of other information which display area 502 may present include selection links, directions for entering serial number, directions for entering 10 or 11 alphanumeric letters and digits, directions for serial numbers containing stars, information clarifying the countries for which zip codes may be entered, selection link for a user not knowing user's current zip code and selection link for international users.

Figure 5B:
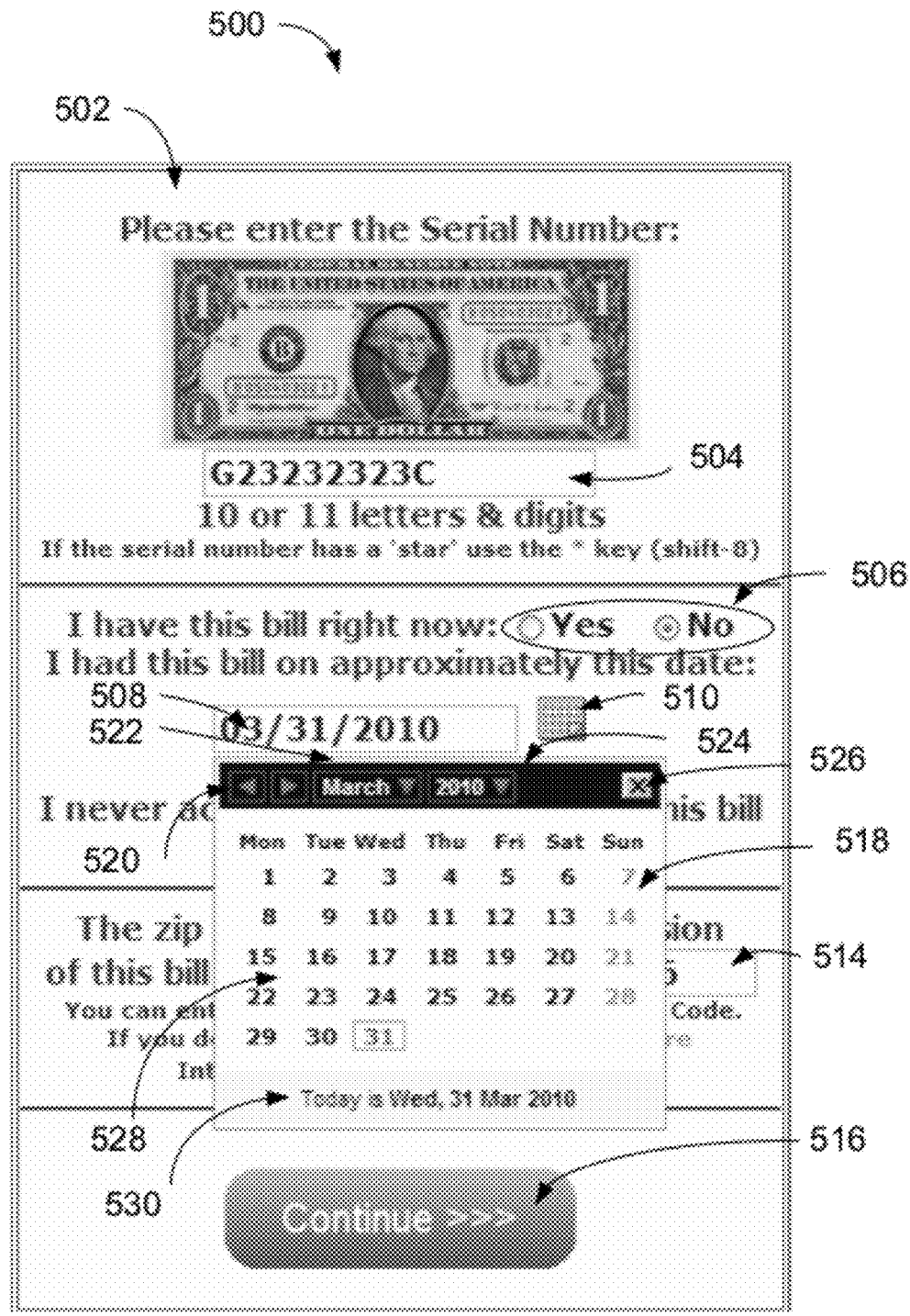

FIG. 5B illustrates a display of information as viewed by a user on a GUI for an exemplary web-enabled/networked embodiment of the present invention.

FIG. 5B includes elements of FIG. 5A with the addition of a calendar display 518 and a serial number entered in serial number input 504, a selection of "No" for possession radio selection 506, a date entered in possession date input 508 and a zip code entered in zip code input 514.

For FIG. 5B, when presented information illustrated in FIG. 5A, user may have opted to select calendar selection link 510 or may have entered a date in possession date input 508. Following selection of calendar selection link 510 or entering date in possession date input 508, user may be presented with calendar display 518 in FIG. 5B.

Calendar display 518 includes a month increment/decrement select 520, a month select 522, a year select 524, a calendar close select 526, a calendar display area 528 and a current date indication 530.

Month increment/decrement select 520 may allow a user to increment or decrement to different months for display by calendar display 518. Month select 522 may allow a user to select a specific month to be displayed by calendar display 518. Year select 524 may allow a user to select a specific year to be displayed by calendar display 518. Calendar close select 526 may allow a user to close calendar display 518. Calendar display area 528 may present user with the month of the year as selected by possession date input 508, month select 522 and year select 524. Current date indication 530 may allow user to be presented with the current date.

FIG. 5A and FIG. 5B illustrate how a searcher may enter information for past, previous or historical possession of a currency note.

Figure 6:
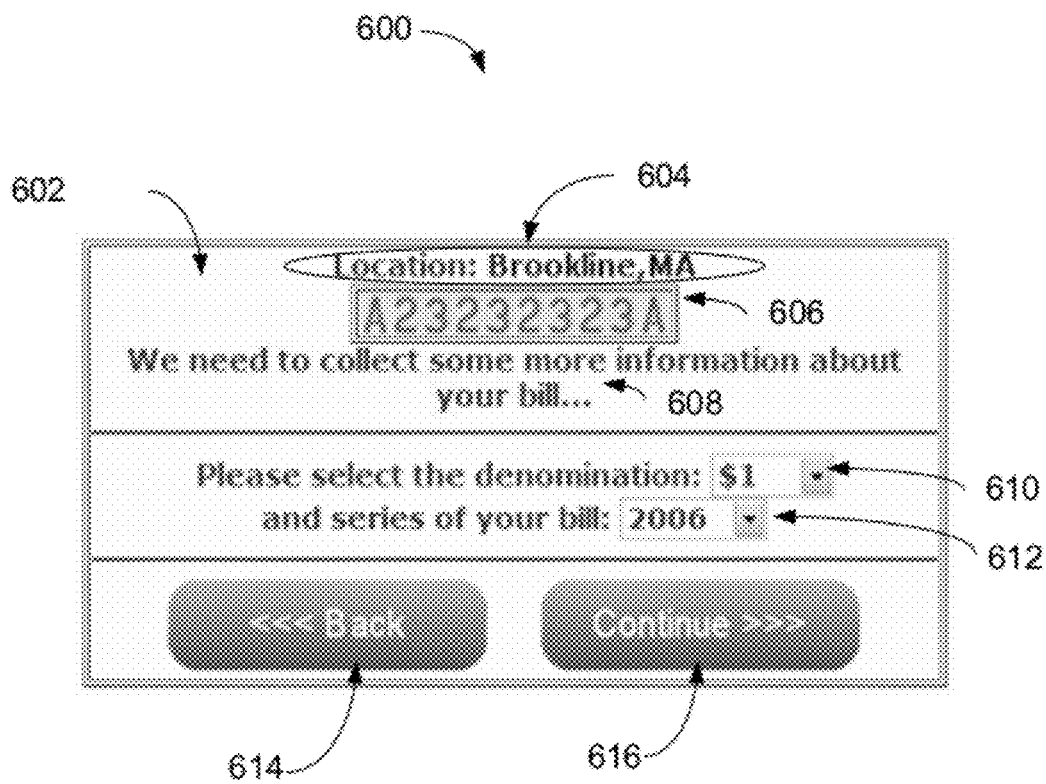
FIG. 6 illustrates a display of information as viewed by a user on a GUI for an exemplary web-enabled/networked embodiment of the present invention.

FIG. 6 illustrates a display of information as viewed by a user on a GUI for an exemplary web-enabled/networked embodiment of the present invention.

An information display 600 includes a display area 602, a location display area 604, an entered serial number area 606, a direction area 608, a denomination selection input 610, a bill series selection input 612, a back selection 614 and a continue selection 616.

Display area 602 may operate to display information to user (not shown). Non-limiting examples of information which may be displayed include text, graphics, input selections, text inputs, selection boxes, radio selections and submit selections. Location display area 604 may operate to present a user's geographic location as indicated by user's previous input. Entered serial number area 606 may operate to present the serial number for a currency note as indicated by user's previous input. Direction area 608 may operate to inform user that more information may be required in order to search for user's currency note. Denomination selection input 610 may operate to receive a selection for the denomination of the currency to be analyzed. Non-limiting examples of denominations which may be selected include $1, $2, $5, $10, $20, $50, and $100. Bill series selection input 612 may operate to receive a selection for the series of the currency to be analyzed. Non-limiting examples of bill series which may be selected include 2006, 2003A, 2003, 2009, 2001, 1999, 1995, 1993, 1988, 1988A, 1985, 1981, 1981A, 1977, 1977A, 1974, 1969, 1969A-D, 1963A-B and 1963. Back selection 614 may operate to allow user to transition to a previous GUI display of information. For example, back selection 614 may allow a user to return to previous steps in order to correct a faulty entry of information. Non-limiting examples of information which may have been entered incorrectly include serial number and current possession indication. Continue selection 616 may operate to allow a user to continue with further processing if the presentation of currency notes found does not match user's currency note. Non-limiting examples of other information which display area 602 may present include selection links and directions.

FIG. 6 illustrates the situation where more information may be required in order to search for a currency note, as the serial number information and other information initially entered by user may not be sufficient for finding a currency note.

Figure 7:
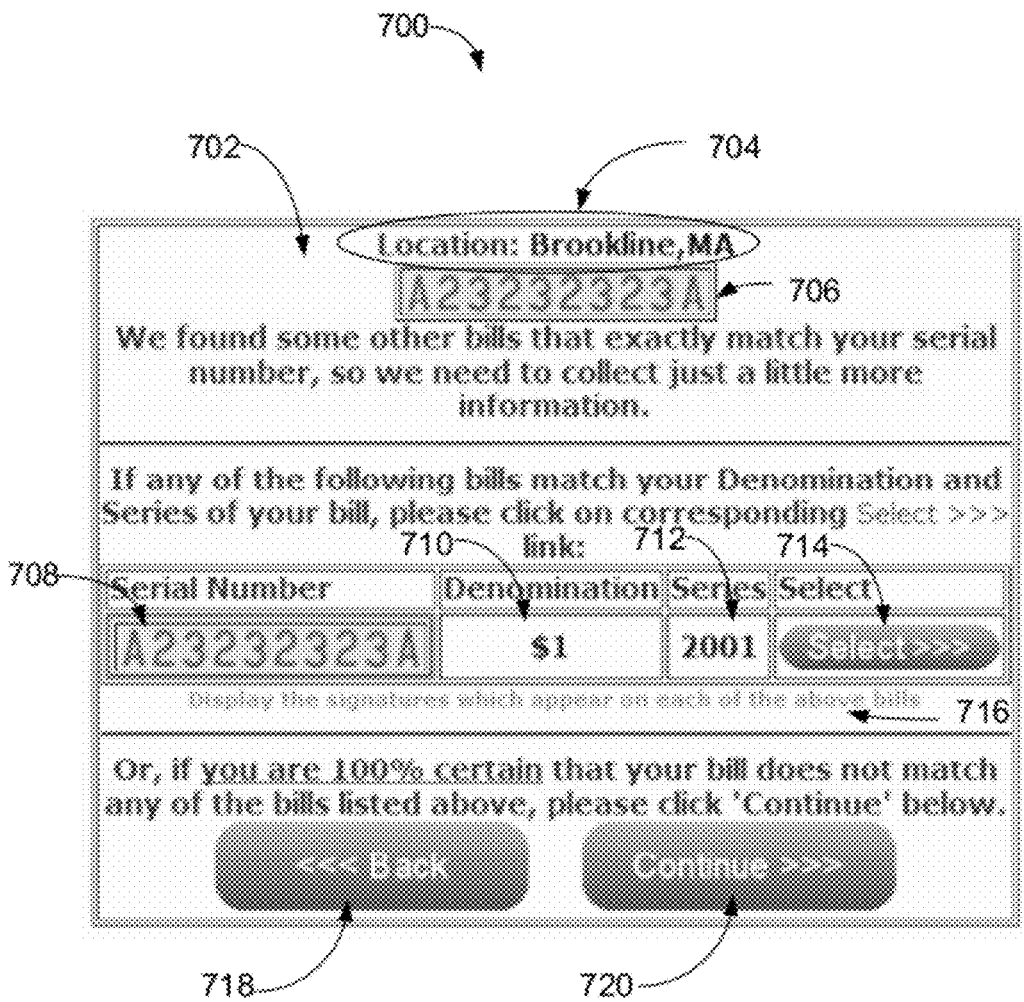
FIG. 7 illustrates a display of information as viewed by a user on a GUI for an exemplary web-enabled/networked embodiment of the present invention.

FIG. 7 illustrates a display of information as viewed by a user on a GUI for an exemplary web-enabled/networked embodiment of the present invention.

An information display 700 includes a display area 702, a location display area 704, an entered serial number area 706, a found serial number area 708, a denomination area 710, a series area 712, a select selection 714, a signature display link 716, a back selection 718 and a continue selection 720.

Display area 702 may operate to display information to user (not shown). Non-limiting examples of information which may be displayed include text, graphics, input selections, text inputs, selection boxes, radio selections and submit selections. Location display area 704 may operate to present a user's geographic location as indicated by user's previous input. Entered serial number area 706 may operate to present the serial number for a currency note as indicated by user's previous input. Found serial number area 708 may operate to indicate a serial number of a currency note which may be currently tracked. Denomination area 710 may operate to indicate the denomination of a currency note which may be currently tracked. Series area 712 may operate to indicate the series of a currency note which may be currently tracked. Select selection 714 may operate to allow a user to select the details for a displayed currency note as matching user's currency note. Signature display link 716 may operate to allow user to display the signatures for potential currency note matches. Back selection 718 may operate to allow user to transition to a previous GUI display of information. For example, back selection 718 may allow a user to return to previous steps in order to correct a faulty entry of information. Non-limiting examples of information which may have been entered incorrectly include serial number and current possession indication. Continue selection 720 may operate to allow a user to continue with further processing if the presentation of currency notes found does not match user's currency note. Non-limiting examples of other information which display area 702 may present include selection links, directions if a found currency note matches user's currency note and directions if found currency notes do not match user's currency note.

Information display 700 presents the situation where a single currency note has been found which may potentially match user's currency note.

Figure 8:
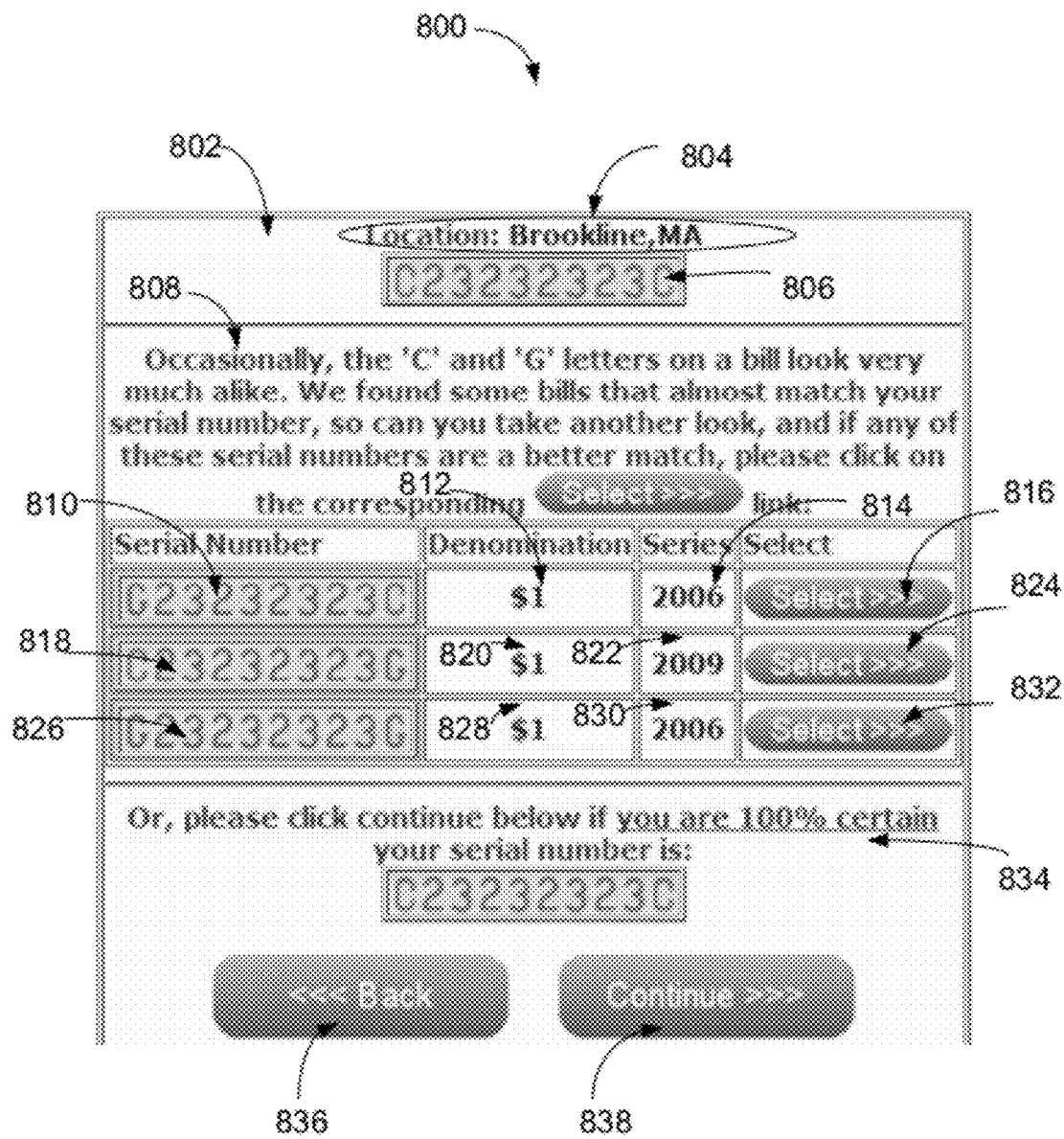
FIG. 8 illustrates a display of information as viewed by a user on a GUI for an exemplary web-enabled/networked embodiment of the present invention.

FIG. 8 illustrates a display of information as viewed by a user on a GUI for an exemplary web-enabled/networked embodiment of the present invention.

An information display 800 includes a display area 802, a location display area 804, an entered serial number area 806, a direction area 808, a found serial number area 810, a denomination area 812, a series area 814, a select selection 816, a found serial number area 818, a denomination area 820, a series area 822, a select selection 824, a found serial number area 826, a denomination area 828, a series area 830, a select selection 832, a direction area 834, a back selection 836 and a continue selection 838.

Display area 802 may operate to display information to user (not shown). Non-limiting examples of information which may be displayed include text, graphics, input selections, text inputs, selection boxes, radio selections and submit selections. Location display area 804 may operate to present a user's geographic location as indicated by user's previous input. Entered serial number area 806 may operate to present the serial number for a currency note as indicated by user's previous input. Direction area 808 may operate to inform user of issues related to mistakes with respect to the alpha characters "C" and "G" for currency notes. Found serial number area 810 may operate to indicate a serial number of a currency note which may be currently tracked. Denomination area 812 may operate to indicate the denomination of a currency note which may be currently tracked. Series area 814 may operate to indicate the series of a currency note which may be currently tracked. Select selection 816 may operate to allow a user to select the details for a displayed currency note as matching user's currency note. Found serial number area 818 may operate to indicate a serial number of a currency note which may be currently tracked. Denomination area 820 may operate to indicate the denomination of a currency note which may be currently tracked. Series area 822 may operate to indicate the series of a currency note which may be currently tracked. Select selection 824 may operate to allow a user to select the details for a displayed currency note as matching user's currency note. Found serial number area 826 may operate to indicate a serial number of a currency note which may be currently tracked. Denomination area 828 may operate to indicate the denomination of a currency note which may be currently tracked. Series area 830 may operate to indicate the series of a currency note which may be currently tracked. Select selection 832 may operate to allow a user to select the details for a displayed currency note as matching user's currency note. Direction area 834 may operate to inform user to verify the serial number of user's currency note matches the information provided by user. Back selection 836 may operate to allow user to transition to a previous GUI display of information. For example, back selection 836 may allow a user to return to previous steps in order to correct a faulty entry of information. Non-limiting examples of information which may have been entered incorrectly include serial number and current possession indication. Continue selection 838 may operate to allow a user to continue with further processing if the presentation of currency notes found does not match user's currency note. Non-limiting examples of other information which display area 802 may present include selection links and directions.

Information display 800 presents the situation where no exact matches have been found for a currency note, but the serial number of the currency note and the serial numbers of found currency notes may be similar and contain an alpha character of "C" and/or of "G". The alpha character of "C" may be easily mistaken for an alpha character of "G" and vice-versa on currency notes. If user has mistakenly entered an alpha character of "C" for a "G" or vice versa, user may be able to recognize incorrect entry and select found currency note matching user's currency note.

Figure 9:
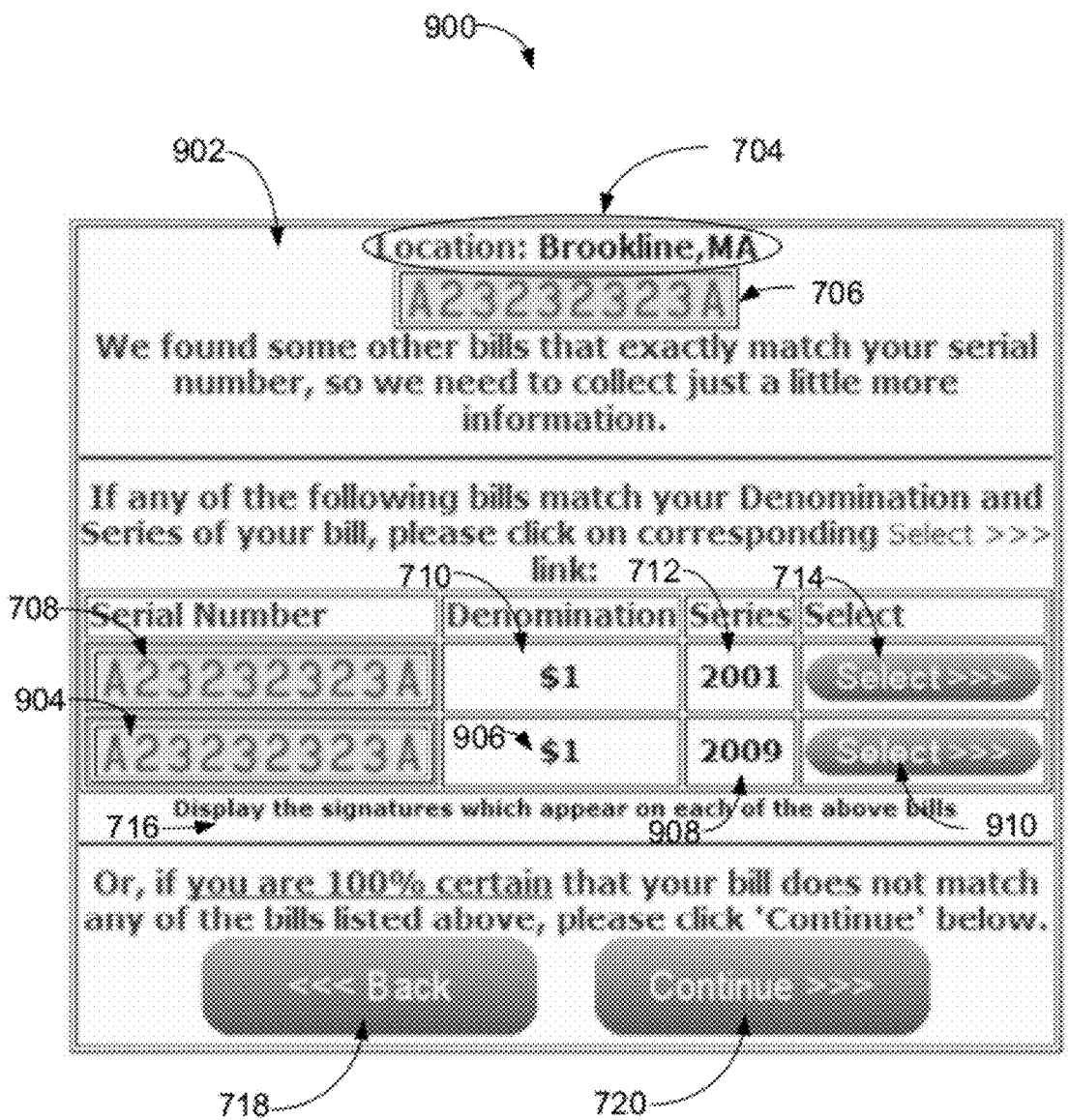
FIG. 9 illustrates a display of information as viewed by a user on a GUI for an exemplary web-enabled/networked embodiment of the present invention.

FIG. 9 illustrates a display of information as viewed by a user on a GUI for an exemplary web-enabled/networked embodiment of the present invention.

FIG. 9 includes elements as described with reference to information display 700 (FIG. 7) with the addition of a second found currency note. Elements common to FIG. 7 and FIG. 9 will not be described with reference to FIG. 9.

An information display 900 includes a display area 902, location display area 704, entered serial number area 706, found serial number area 708, denomination area 710, series area 712, select selection 714, signature display link 716, back selection 718, continue selection 720, a found serial number area 904, a denomination area 906, a series area 908 and a select selection 910.

Found serial number area 904 may operate to indicate a serial number of a currency note which may be tracked. Denomination area 906 may operate to indicate the denomination of a currency note which may be tracked. Series area 908 may operate to indicate the series of a currency note which may be tracked. Select selection 910 may operate to allow a user to select the details for a displayed currency note as matching user's currency note.

FIG. 9 illustrates the situation where multiple currency notes have been found which may potentially match user's currency note and user may select a found currency note which matches user's currency note.

Figure 10:
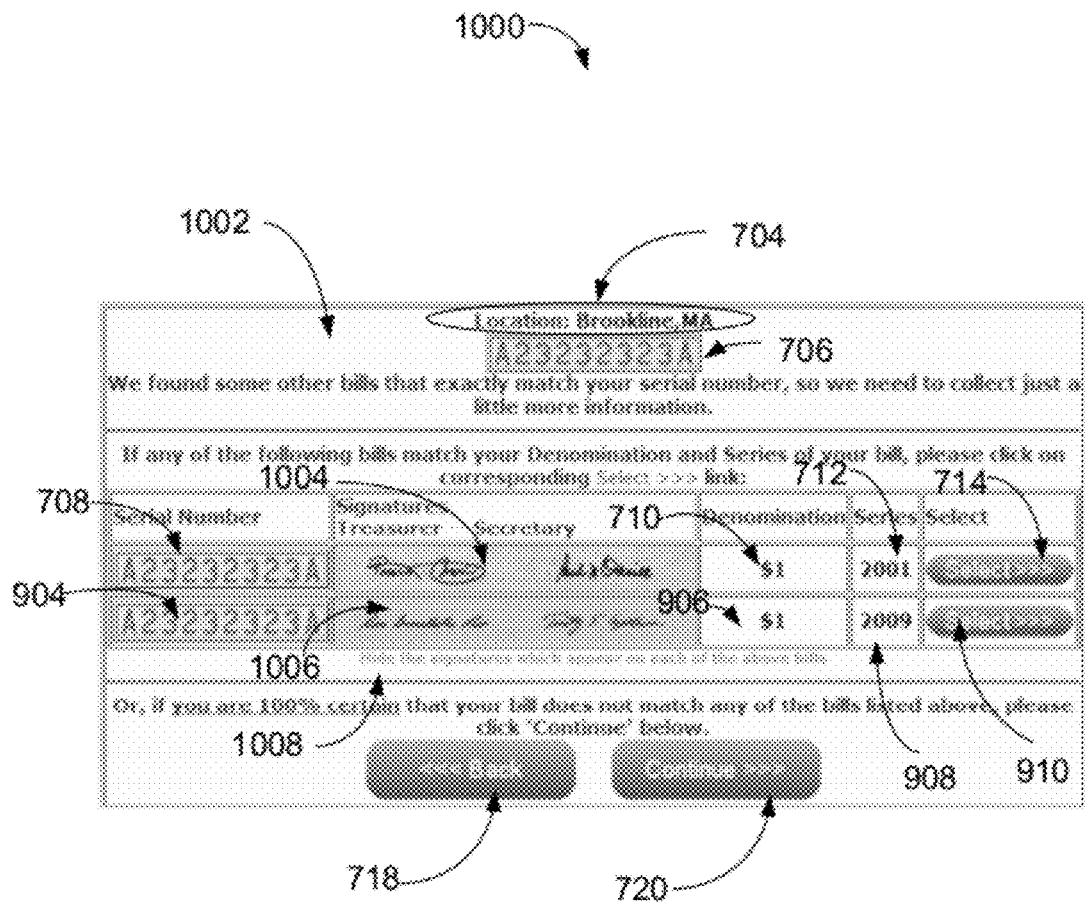
FIG. 10 illustrates a display of information as viewed by a user on a GUI for an exemplary web-enabled/networked embodiment of the present invention.

FIG. 10 illustrates a display of information as viewed by a user on a GUI for an exemplary web-enabled/networked embodiment of the present invention.

FIG. 10 illustrates elements as described with reference to FIG. 7 and FIG. 9 with the addition of areas for displaying signatures of found currency notes on a GUI. Common elements of FIG. 7, FIG. 9 and FIG. 10 will not be described with reference to FIG. 10.

An information display 1000 includes a display area 1002, location display area 704, entered serial number area 706, found serial number area 708, denomination area 710, series area 712, select selection 714, back selection 718, continue selection 720, found serial number area 904, denomination area 906, series area 908, select selection 910 a signature area 1004, a signature area 1006 and a signature removal link 1008.

Signature area 1004 may operate to display the signatures of Treasurer and Secretary located on a first found currency note. Signature area 1006 may operate to display the signatures of Treasurer and Secretary located on a second found currency note. Signature removal link 1008 may operate to remove the presentation of signature area 1004 and signature area 1006. Selection of signature removal link 1008 by user may result in the presentation of information display 900 (FIG. 9) to user.

Information display 1000 presents the situation when multiple currency notes have been found which may potentially match user's currency note and user has selected to view signatures located on found currency notes. Display signatures of found currency notes may aid users in determining a match for a searched currency note.

Figure 11:
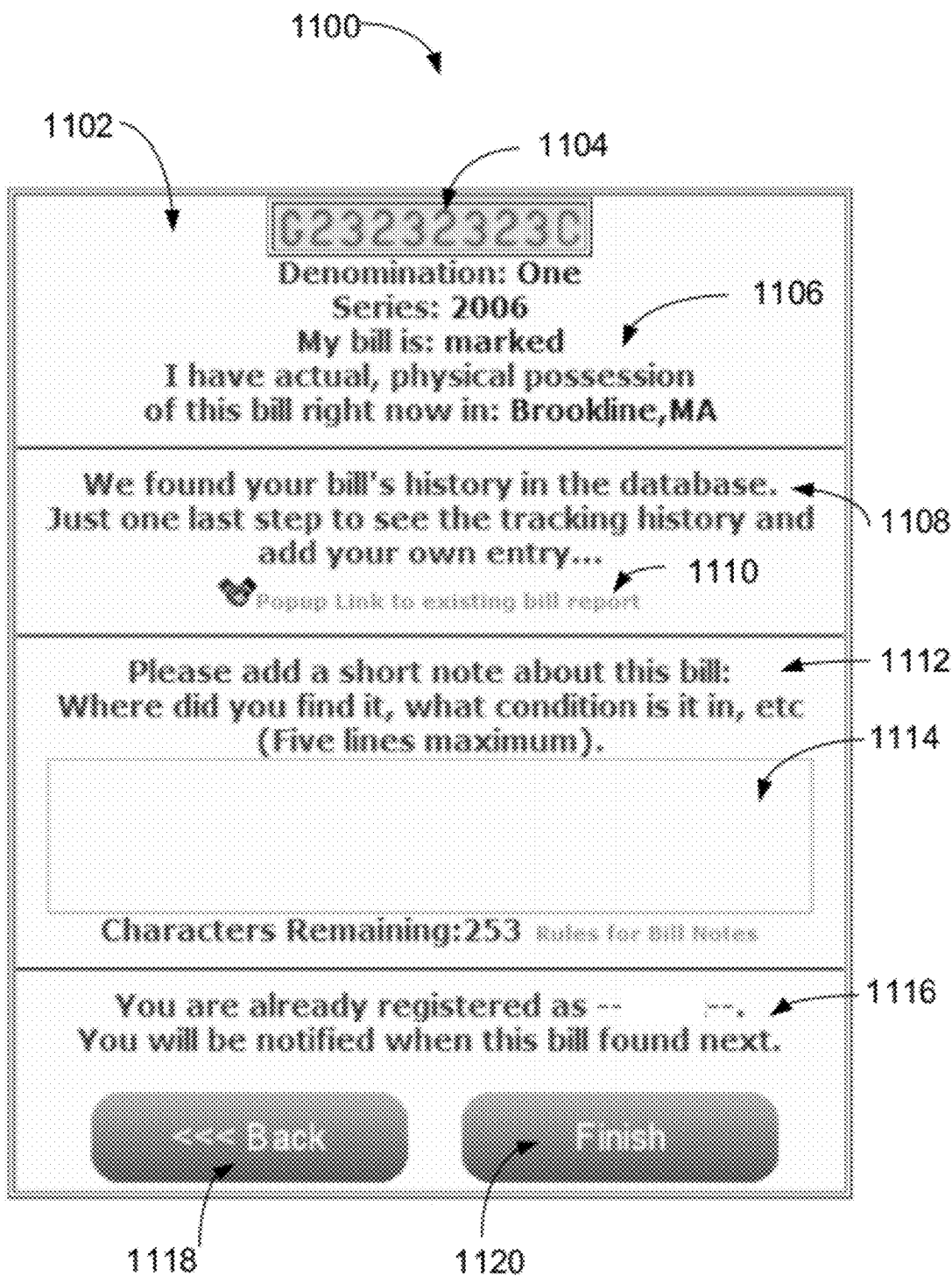
FIG. 11 illustrates a display of information as viewed by a user on a GUI for an exemplary web-enabled/networked embodiment of the present invention.

FIG. 11 illustrates a display of information as viewed by a user on a GUI for an exemplary web-enabled/networked embodiment of the present invention.

An information display 1100 includes a display area 1102, an entered serial number area 1104, a bill information area 1106, an information area 1108, a bill report link 1110, a direction area 1112, a text input 1114, an information area 1116, a back selection 1118 and a continue selection 1120.

Display area 1102 may operate to display information to user (not shown). Non-limiting examples of information which may be displayed include text, graphics, input selections, text inputs, selection boxes, radio selections and submit selections. Entered serial number area 1104 may operate to present the serial number for a currency note as indicated by user's previous input. Bill information area 1106 may operate to inform user of the details related to the found and selected currency note. Non-limiting examples of information which may be presented in bill information area 1106 include denomination, series, marked status, user possession/non-possession and geographic location of currency note. Information area 1108 may operate to inform user of the status of the currency note search. Bill report link 1110 may operate to allow user to select to view a report for the currency note as denoted by entered serial number area 1104 and bill information area 1106. Direction area 1112 may operate to inform user to enter text information into text input 1114 related to the currency note found and selected. Non-limiting examples of information which direction area 1112 may inform user include geographic location and condition for currency note. Text input 1114 may operate to allow user to enter information related to the currency note which may have been found and selected. Information area 1116 may operate to inform user of status and future notifications. Non-limiting examples of information which may be presented to user in information area 1116 include registration status of user (e.g. registered or not registered) and user may be notified when future entries may be performed for the currency note. Back selection 1118 may operate to allow user to transition to a previous GUI display of information. For example, back selection 1118 may allow a user to return to previous steps in order to correct a faulty entry of information. Non-limiting examples of information which may have been entered incorrectly include serial number and current possession indication. Continue selection 1120 may operate to allow a user to continue with further. Non-limiting examples of other information which display area 1102 may present include selection links and other textual information.

Information display 1100 presents information to a user related to a found and matched currency note and allows user to enter additional information related to the currency note.

Figure 12A:
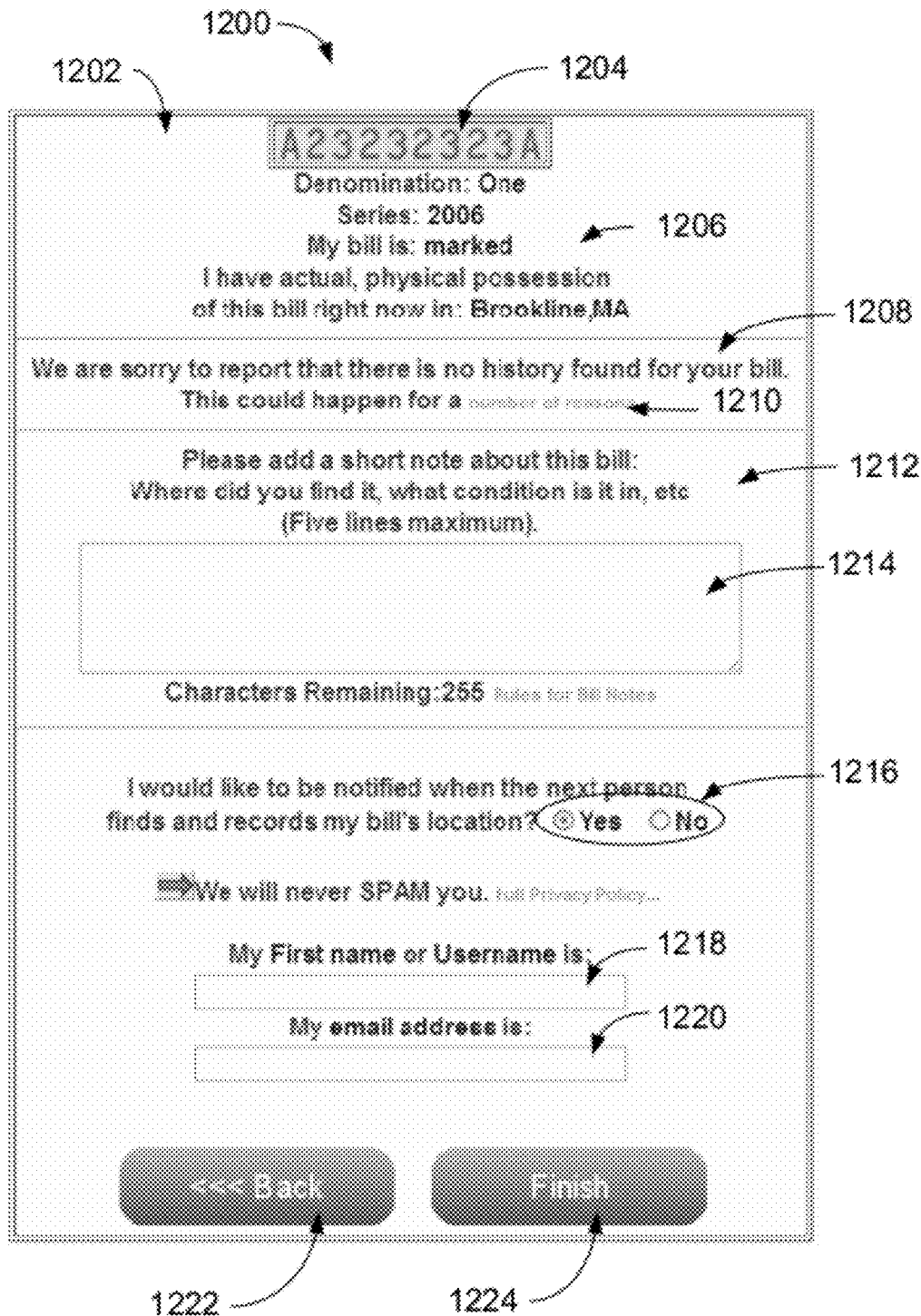
FIG. 12A-C illustrates a display of information as viewed by a user on a GUI for an exemplary web-enabled/networked embodiment of the present invention.

FIG. 12A illustrates a display of information as viewed by a user on a GUI for an exemplary web-enabled/networked embodiment of the present invention.

An information display 1200 includes a display area 1202, an entered serial number area 1204, a bill information area 1206, an information area 1208, a reasons link 1210, a direction area 1212, a text input 1214, a notification radio selection 1216, a username input 1218, an email address input 1220, a back selection 1222 and a continue selection 1224.

Display area 1202 may operate to display information to user (not shown). Non-limiting examples of information which may be displayed include text, graphics, input selections, text inputs, selection boxes, radio selections and submit selections. Entered serial number area 1204 may operate to present the serial number for a currency note as indicated by user's previous input. Bill information area 1206 may operate to inform user of the details related to the found and selected currency note. Non-limiting examples of information which may be presented include denomination, series, marked status, user possession/non-possession and geographic location of currency note. Information area 1208 may operate to inform user of the status of a search for a currency note. A non-limiting example of status information for information area 1208 may include not finding a match for a currency note. Reasons link 1210 may operate to allow user to select to view a report for the reasons for not finding a currency note. Direction area 1212 may operate to inform user to enter text information related to the currency note searched into text input 1214. Non-limiting examples of information which direction area 1212 may inform user include geographic location of currency note and condition. Text input 1214 area may operate to allow user to enter information related to the currency note which may have been searched for. Notification radio selection 1216 may operate to allow user to indicate if user seeks to be notified for a future entry performed for the currency note. Username input 1218 may allow a user to enter a username for creating an account or for an existing account. Email address input 1220 may allow a user to enter an email address for notification of future entries performed for the currency note. Back selection 1222 may operate to allow user to transition to a previous GUI display of information. For example, back selection 1222 may allow a user to return to previous steps in order to correct a faulty entry of information. Non-limiting examples of information which may have been entered incorrectly include serial number and current possession indication. Continue selection 1224 may operate to allow a user to continue with further. Non-limiting examples of other information which display area 1202 may present include selection links, selections links for privacy policy, directions, information and information related to not sending unsolicited email (e.g. SPAM).

Figure 12B:
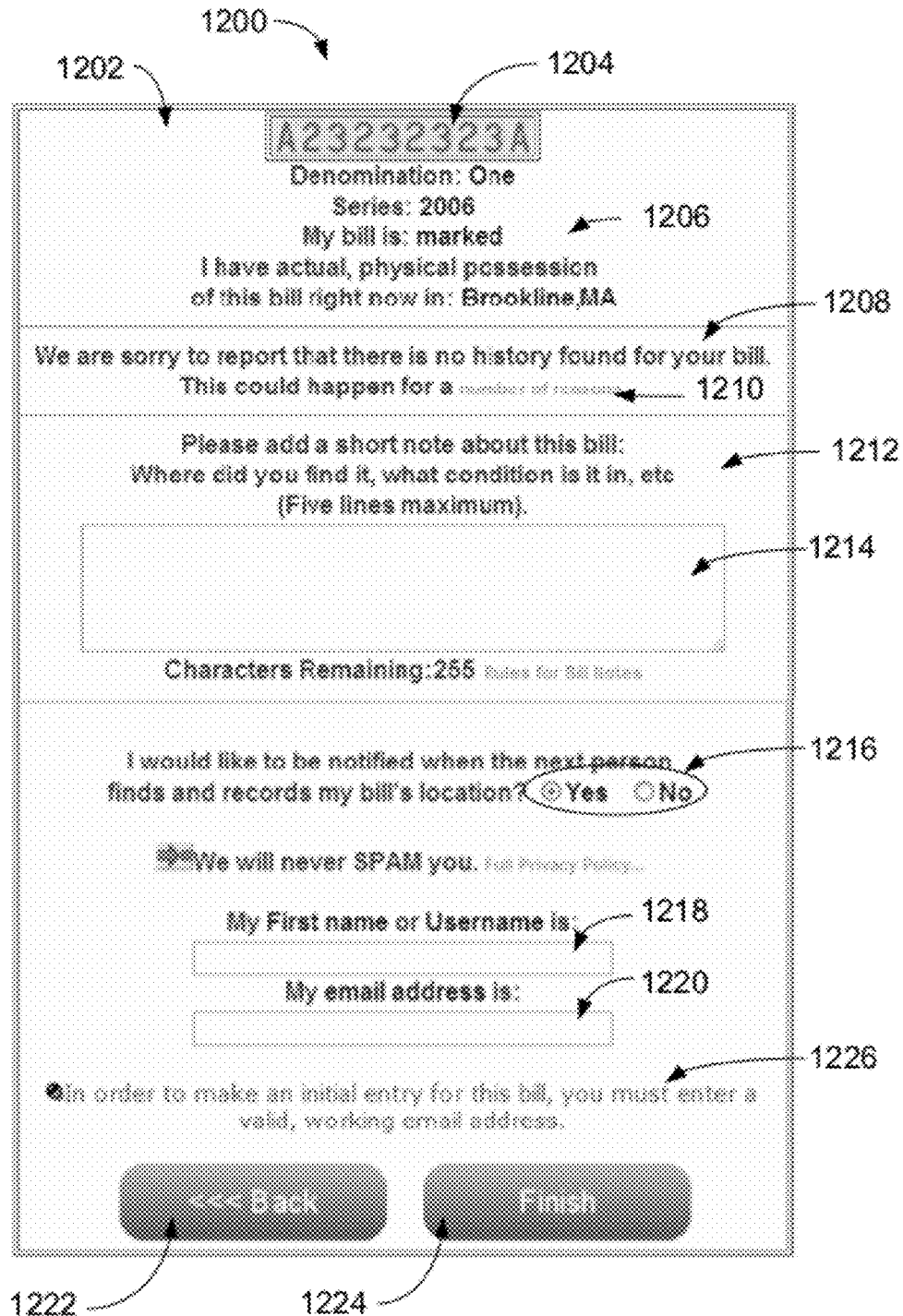

FIG. 12B includes elements of FIG. 12A with the addition of an information area 1226.

Information area 1226 may operate to inform user a valid and functional email address may be required to be entered in order to generate an initial entry for a currency note.

Figure 12C:
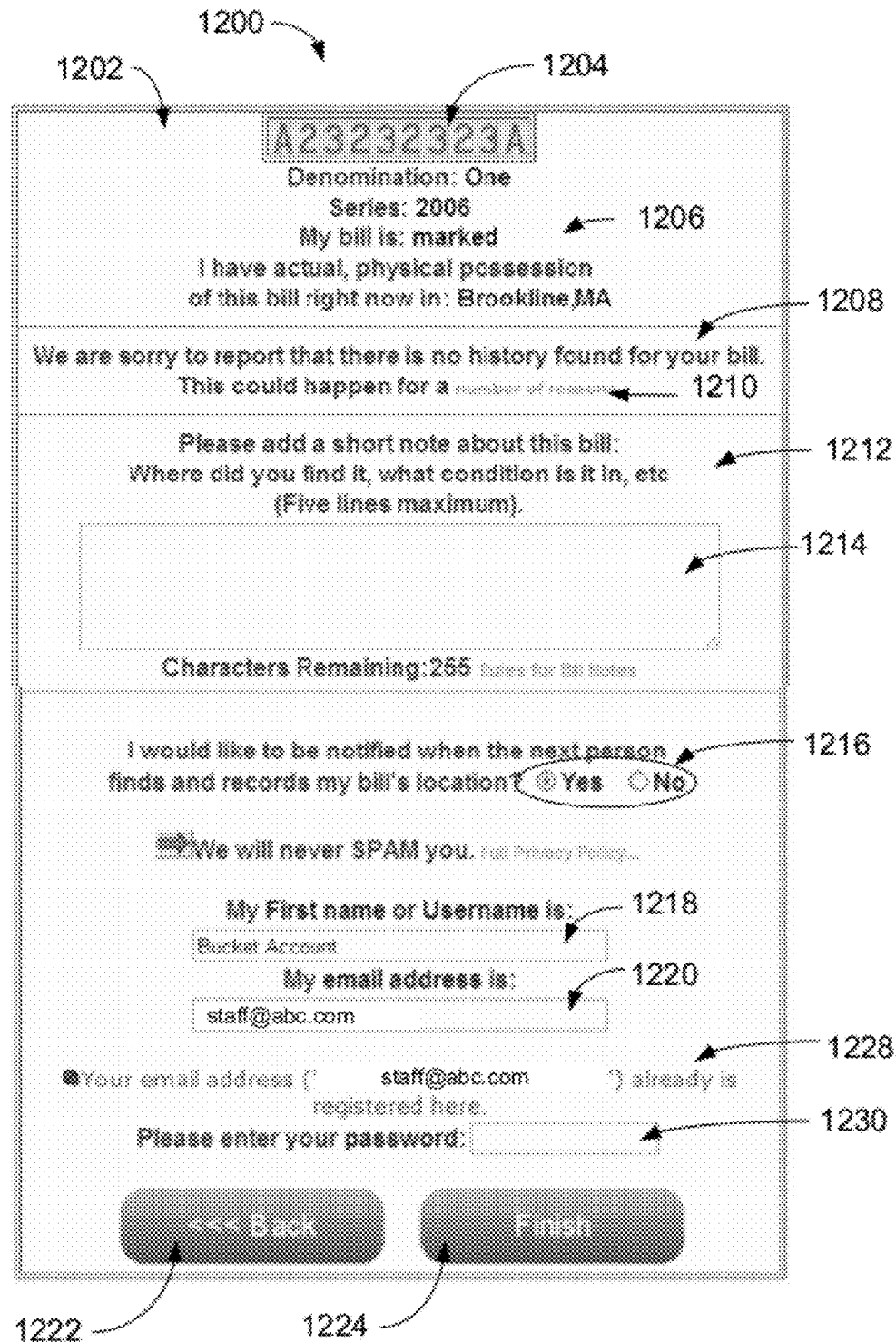

FIG. 12C illustrates a display of information as viewed by a user on a GUI for an exemplary web-enabled/networked embodiment of the present invention.

FIG. 12C includes the elements of FIG. 12A with the addition of an information area 1228 and a password input 1230.

FIG. 12C displays the username entered by user in username input 1218 and also the email address in email address input 1220 as entered following display of FIG. 12A. FIG. 12C may be presented to user after presentation of FIG. 12A if user enters and submits an existing email address into email address input 1220.

Information area 1228 may operate to inform user that the email address entered in email address input 1220 already exists. Password input 1230 may allow user to enter a password for the username previously entered in username input 1218 and the email address previously entered in email address input 1220.

As illustrated in FIG. 12A-C, information display 1200 may operate to present user with information denoting a failure in finding a match for a currency note and inform user a working email address may be required in order to generate an initial entry for a currency note. Furthermore, information display 1200 may operate to present user with a streamlined and efficient method for logging into an existing account or creating a new account.

FIG. 13 illustrates a display of information as viewed by a user on a GUI for an exemplary web-enabled/networked embodiment of the present invention.

An information display 1300 includes a display area 1302, a currency information display area 1304, a statistical information display area 1306, an information display area 1308, a location information display area 1310, a location information display area 1312, a location information display area 1314, a map display area 1316, a first location 1318, a second location 1320, a third location 1322.

A travel indicator 1324 may be provided in order to indicate a general direction of travel from first location 1318 to second location 1320. A travel indicator 1326 may be provided in order to indicate a general direction of travel from second location 1320 to third location 1322.

Display area 1302 may operate to display information to user (not shown). Non-limiting examples of information which may be displayed include text, graphics, input selections, text inputs, selection boxes, radio selections and submit selections.

Currency information display area 1304 may operate to present to user with information related to searching and tracking for a currency note. Non-limiting information which may be provided by currency information display area 1304 includes denomination, serial number and series. Statistical information display area 1306 may operate to present to user information related to the statistics for searching for and finding tracking information for a currency note. Non-limiting information which may be presented by statistical information display area 1306 includes total miles traveled in a particular time period (e.g. year), average miles per day and total miles from initial location. Information display area 1308 may operate to inform user of information related to information display 1300. A non-limiting example of information which may be provided by information display area 1308 includes noting the information displayed may be provided in reverse-chronological order. Location information display area 1310 may operate to display information related to the currency note with respect to third location 1322. Non-limiting information which may be provided in location information display area 1310 includes date/time of entry by a user, location as entered by a user, travel time from previous entry at second location 1320, distance traveled "as-a-bird-flies" from previous entry at second location 1320, average speed when traveling from previous entry at second location 1320, selection link for sending anonymous email to user making entry for first location 1318, selection links for user profile information and user notes. Non-limiting examples of selection links for user profile information which may be provided include user name, comments, user statistics, and associated social networking websites. Location information display area 1312 may operate to provide similar information as described with respect to location information display area 1310 except regarding second location 1320. Location information display area 1314 may operate to provide similar information as described with respect to location information display area 1310 except regarding first location 1318 and with some information denoted as not applicable. Non-limiting examples of information provided by location information display area 1314 which may be presented as not applicable include time of travel, distance traveled and average speed. Display area 1314, in this example, demonstrates how an 'alternate' entry may appear differently from 'valid' entries on the bill report—in this example, a different color background, or possibly (not shown) a text area with a short explanation or code indicating the reason for 'alternate' treatment of that entry. Except for Display area 1314 display feature, the design of the generic bill report is prior art. Map display area 1316 may operate to present to user a graphical geographic representation for the travel of the found currency note. For example, as illustrated in map display area 1316, found currency note may initially have been entered for first location 1318, followed by an entry created for second location 1320 and followed by an entry created for third location 1322.

Information display 1300 may provide user with textual and graphical information related to a found and matched currency note.

FIG. 14A-G illustrates operation of an exemplary web-enabled embodiment of the present invention.

Figure 2:
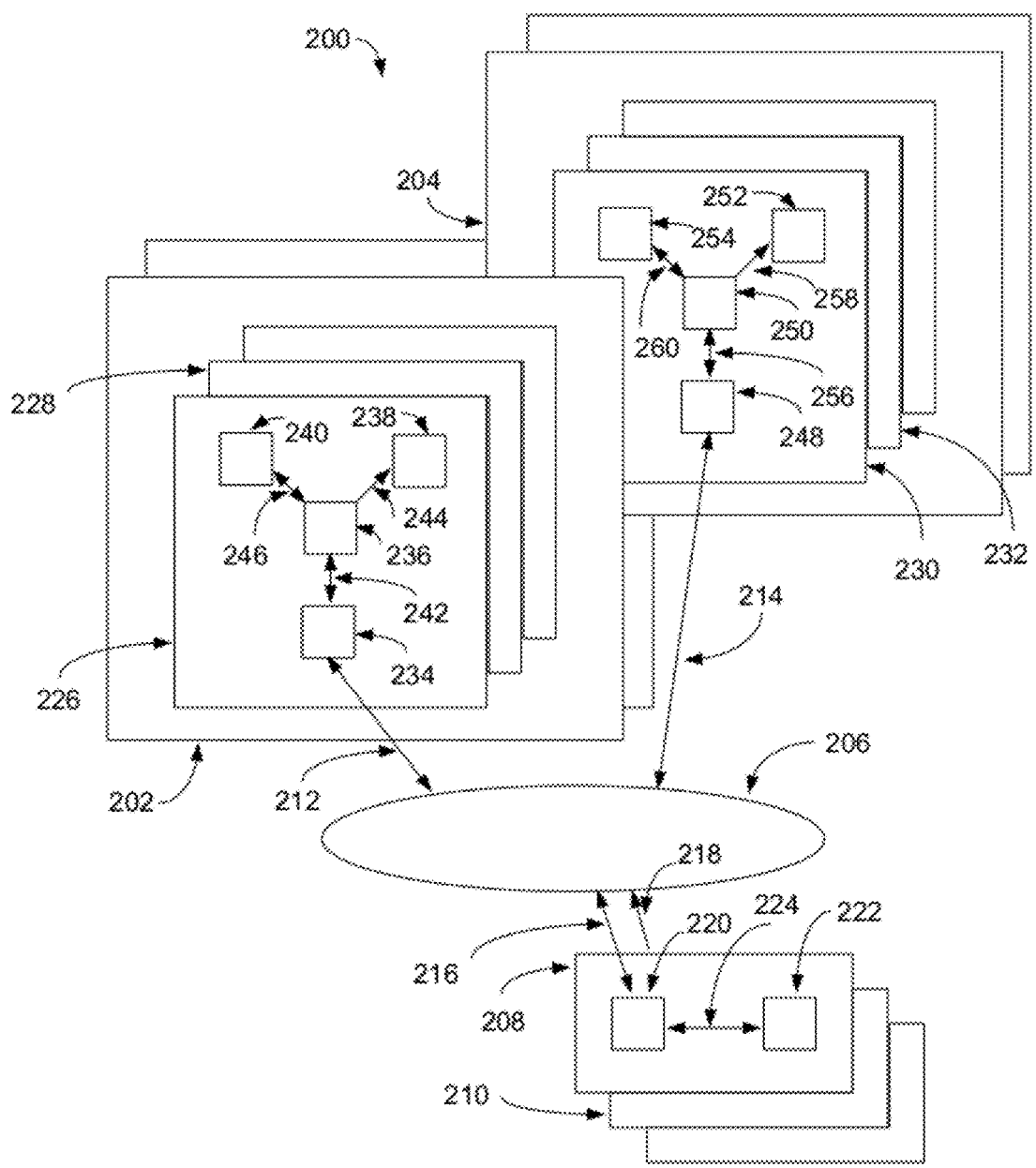
FIG. 2 illustrates a block diagram depicting a conventional regionalized client/server communication system.
Figure 14A:
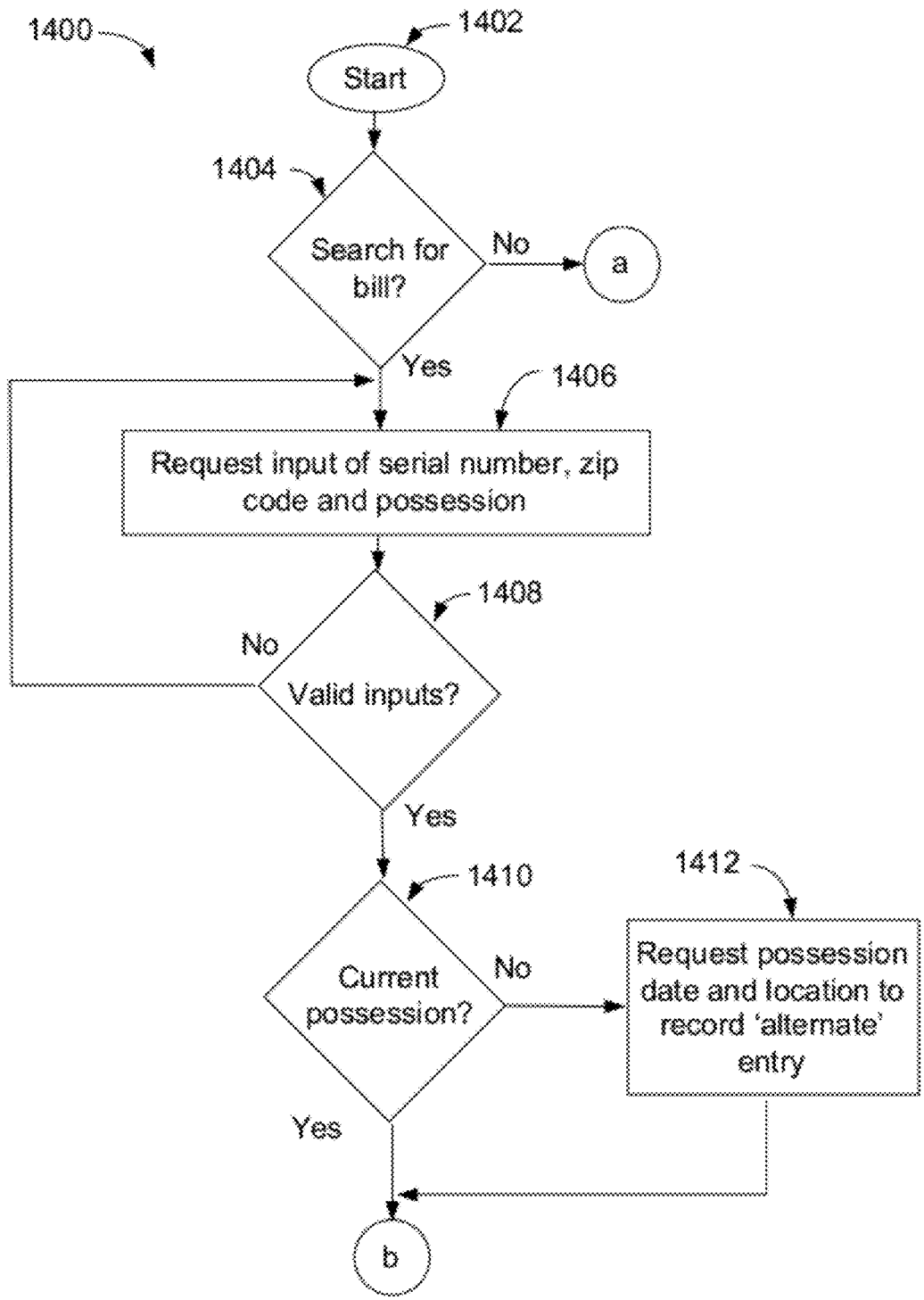
FIG. 14A-G illustrates operation of an exemplary web-enabled embodiment of the present invention.

FIG. 14A-G illustrates a flow chart 1400 illustrating an exemplary process for the execution of software in accordance with an embodiment of the present invention. In the present exemplary embodiment, the process initiates in a step 1402 (FIG. 14A). The software may be operable for instruction execution and storage of information on server 222 (FIG. 2). In step 1402, user may enter the IP address for execution of the software using interface device 240 (FIG. 2). As illustrated in FIG. 2, the entered IP address may be communicated to server 222 via transfer of the IP address from interface device 240 to processor 236 via communication channel 246, from processor 236 to networking device 234 via communication channel 242, from networking device 234 to global network 206 via communication channel 212, from global network 206 to networking device 220 via communication channel 216 and from networking device 220 to server 222 via communication channel 224. Server 222 receives IP address and proceeds to transmit information to GUI 238 via communication channel 224, networking device 220, communication channel 216, global network 206, communication channel 212, networking device 234, communication channel 242, processor 236 and communication channel 244. In a step 1404, user may be prompted with information display 300 (FIG. 3) on GUI 238 (FIG. 2) of client 226 (FIG. 2) to select whether user may be a searcher and seeks to search for a currency note as illustrated by searching select 304 (FIG. 3) or may be user a tracker and seeks to track a currency note as illustrated by tracking select 306 (FIG. 3). For a user seeking to search for a currency note, user may select searching select 304 (FIG. 3) on GUI 238 (FIG. 2) using interface device 240 (FIG. 2). For a user seeking to track a currency note, user may select tracking select 306 (FIG. 3) on GUI (FIG. 2) using interface device 240 (FIG. 2). Communication of user selection may be communicated to server 222 (FIG. 2) as previously discussed. For a determination of user seeking to search for a currency note, user may in a step 1406 be presented with information display 400 (FIG. 4) on GUI 238 (FIG. 2) and be requested to enter the serial number of currency note in serial number input 404 (FIG. 4), zip code for user and currency note location in zip code input 408 (FIG. 4) and possession selection choice for possession radio selection 406 (FIG. 4). A user in possession of the currency note may select the "Yes" radio button of possession radio selection 406 (FIG. 4) and a user not in possession of the currency note may select the "No" radio button of possession radio selection 406 (FIG. 4). After user selects continue select 410 (FIG. 4) the information entered in step 1406 may be validated in a step 1408. For an invalid determination in step 1408, software execution may return to step 1406. Validity may be determined with following non-limiting steps:

1. The Serial number has a proper format. Two formats of serial numbers exist: (a) 10 characters=One letter ('Federal Reserve Bank' code)+eight numbers+one letter ('Block letter' code) or (b) 11 characters=one letter ('Series' code)+one letter ('Federal Reserve Bank' code)+8 numbers+1 letter ('Block Letter' code)
2. 'Federal Reserve Bank' code is a valid letter A through L
3. 'Block Letter' is a valid letter A through N or P through Z or * (asterisk)
4. The bill has not been previously blocked from entry—non-limiting examples being bills displayed on the internet, TV, radio contests, or advertisements, etc. These types of 'public' bills can not be tracked.
5. The serial number is not 'faked', i.e. 00000000 or 12345678 or other very common sequences of numbers that are extremely rare in actual use.

Figure 14B:
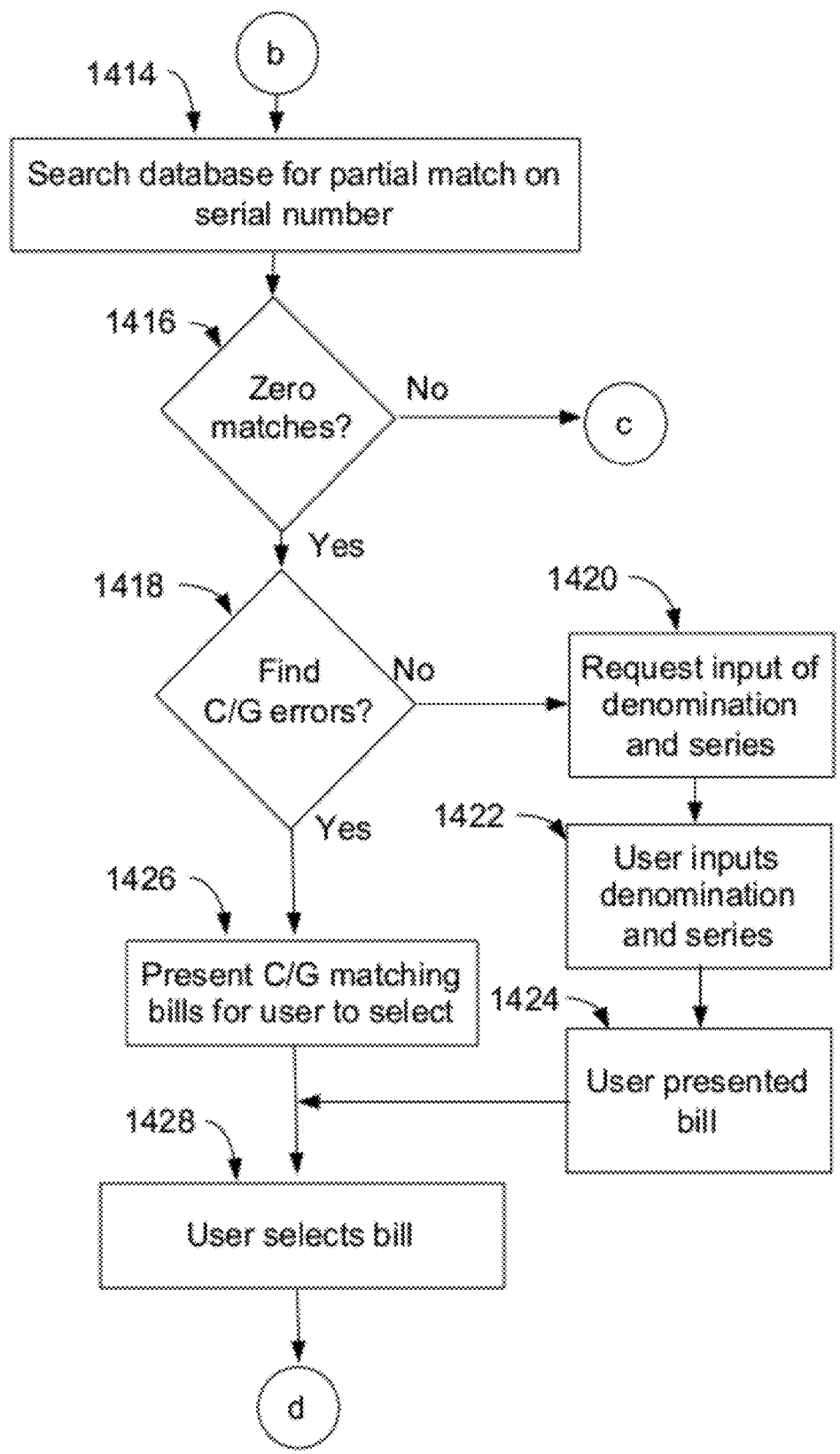
Figure 14C:
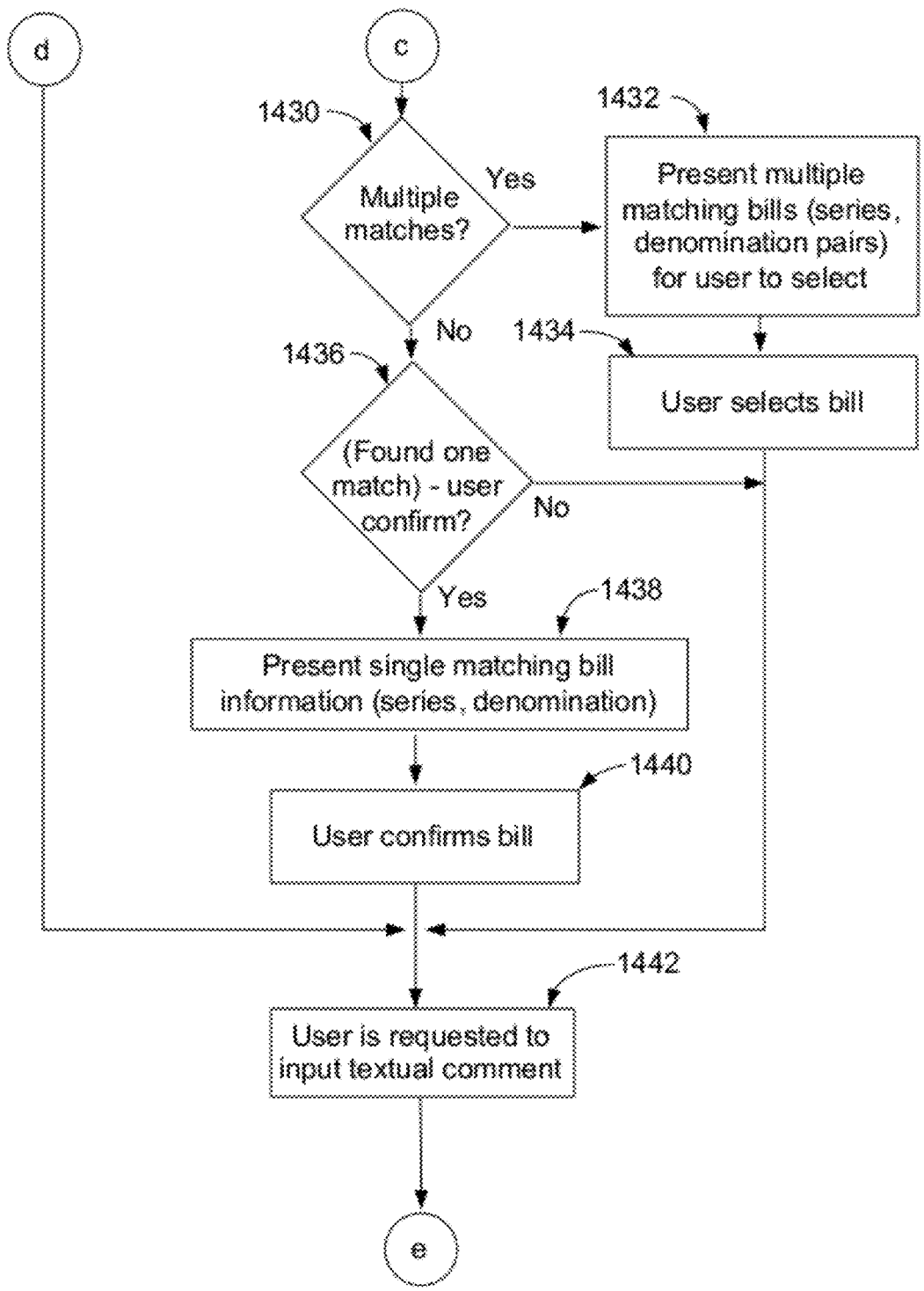
Figure 14D:
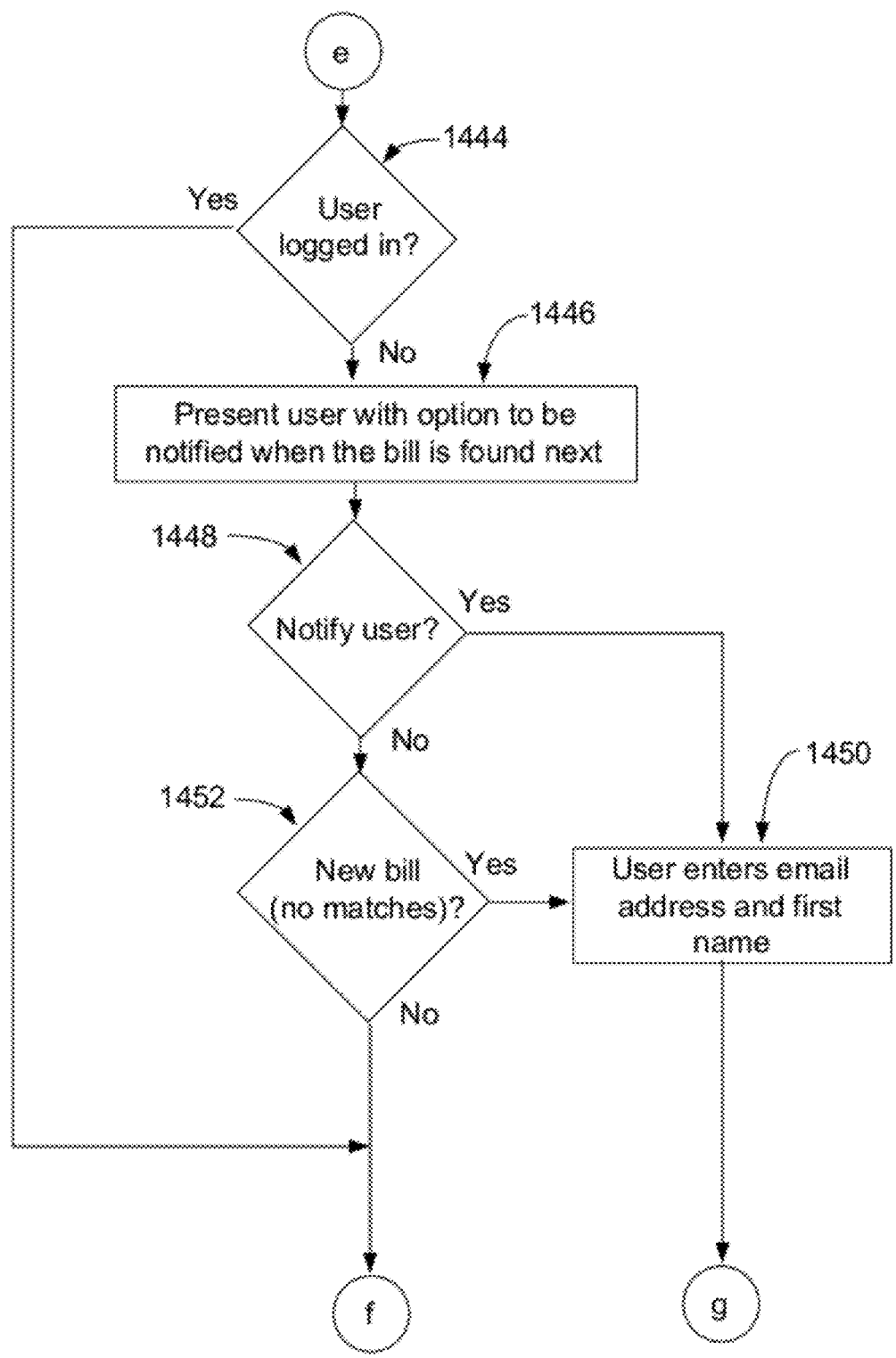
Figure 14E:
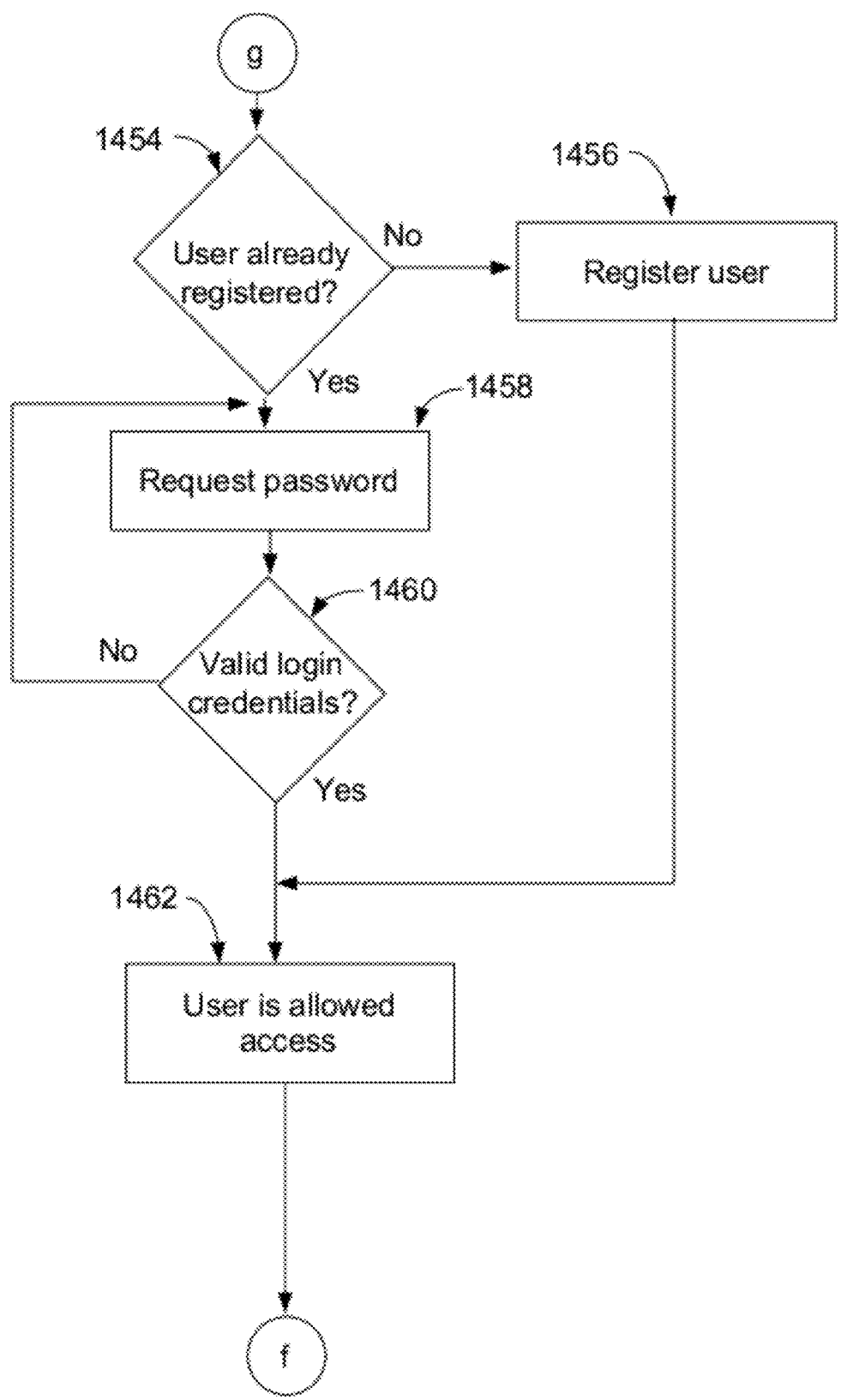
Figure 14F:
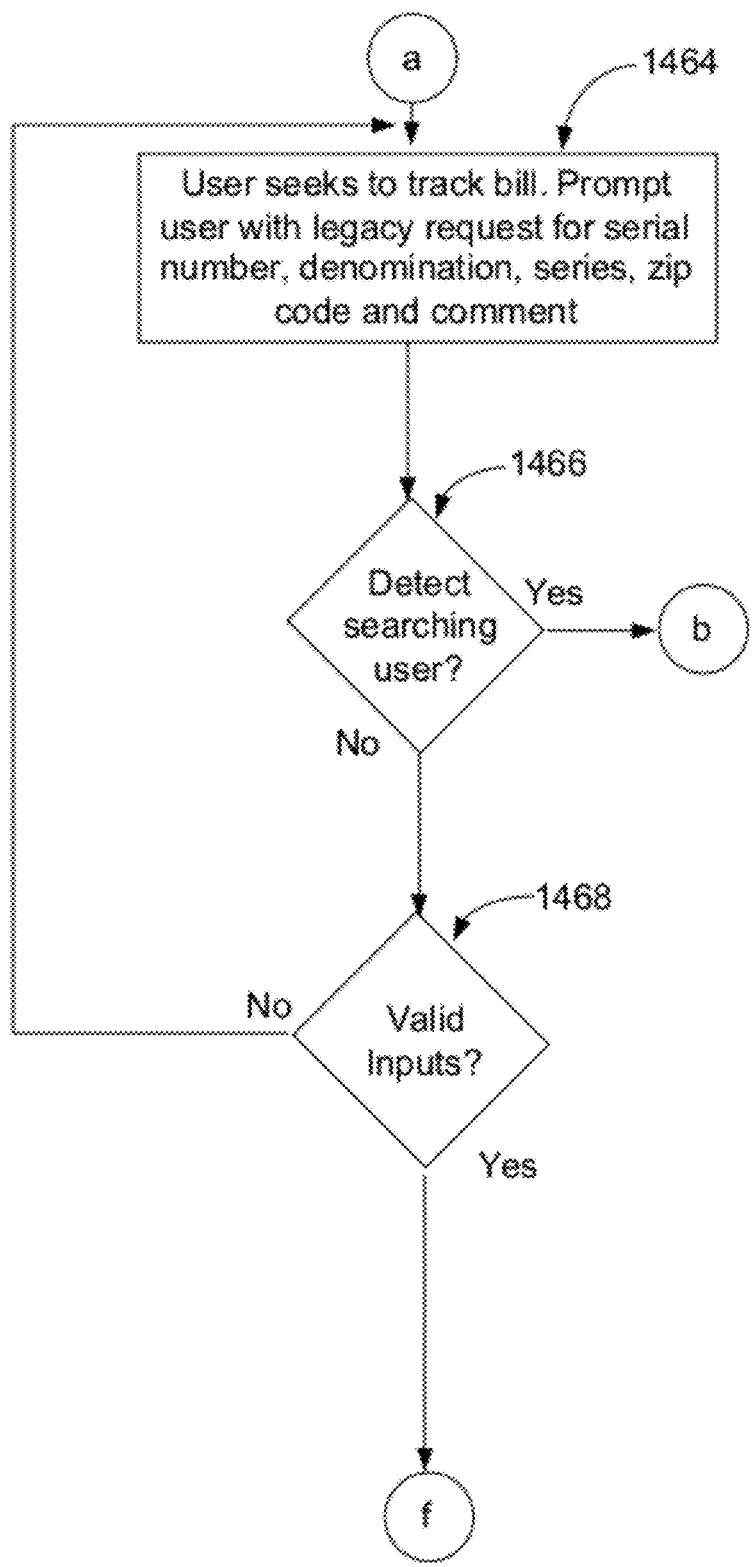
Figure 14G:
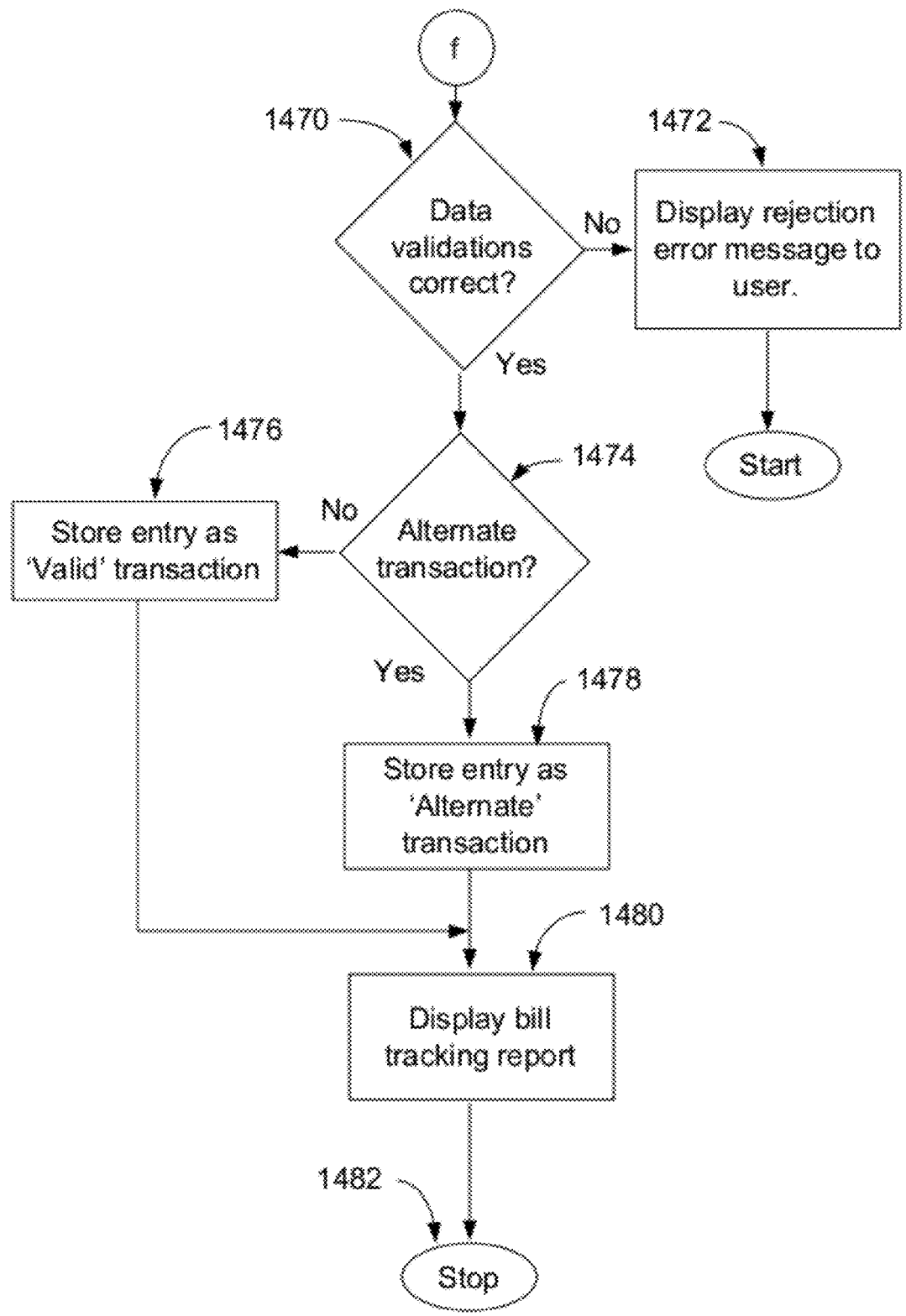

For a valid determination in step 1408, it may be determined in a step 1410 if user has current possession of the currency note. Current possession may be determined by the selection chosen for possession radio selection 406 (FIG. 4) entered in step 1406. A selection of "Yes" for possession radio selection 406 indicates user having possession and a selection of "No" for possession radio selection 406 indicates user not having possession. For a determination of no possession, user in a step 1412 may be presented with information display 500 (FIG. 5A) and be requested to enter a date or an approximate date of possession in possession date input 508 or optionally be presented with information display 500 (FIG. 5B) and be requested to select a date or an approximate date of possession using calendar display 518 (FIG. 5B). Following step 1410 and step 1412, software may in a step 1414 (FIG. 14B) operate to search database of server 222 (FIG. 2) for a partial match of the serial number previously input by user. A determination for a partial match of a serial number may be executed in a step 1416. A partial search means searching the database for any bills matching only on serial number and ignoring the series and denomination attributes of bills in the database. In some embodiments, only the numeric elements of the serial may be used for the partial match. For a determination of an affirmation of a partial serial number match in step 1416, it may be determined in a step 1418 if alpha character "C"/"G" conflicts exist. A currency note with the alpha character "C" may often be mistakenly entered with the alpha character "G" or observed as the alpha character "G" and vice-versa. For a determination of no "C"/"G" conflicts found in step 1418, user may in a step 1420 be presented with information display 600 (FIG. 6) and be requested to select the denomination for the currency note in denomination selection input 610 (FIG. 6) and to select the series of the currency note in bill series selection input 612 (FIG. 6). In a step 1422, user may enter the denomination and series for the currency note as requested. In a step 1424, user may be presented with a matching currency note as illustrated by information display 700 (FIG. 7). For a determination of "C"/"G" conflicts found in step 1418, user may in a step 1426 be presented with information display 800 (FIG. 8) and be requested to select a matching currency note. Following steps 1424 and 1426 user may select a matching currency note in a step 1428 by choosing one of select selection 816, select selection 824 or select selection 832. For a determination of no partial serial number matches in step 1416 (FIG. 14B), it may determined in a step 1430 (FIG. 14C) if multiple partial serial number matches may have been found. For a determination of multiple partial serial number matches in step 1430, user may in a step 1432 be presented with information display 900 (FIG. 9) and be requested to select a matching currency note. User may optionally select to view signatures of found currency notes by selecting signature display link 716 (FIG. 9). By selecting signature display link 716, user may be presented with information display 1000 (FIG. 10) which may display signatures in signature areas 1004 (FIG. 10) and 1006 (FIG. 10) for found partially matching currency notes. Viewing signatures of bills may aid user in selecting a matching currency note. After step 1432, user may select a matching currency note in a step 1434 by choosing select selection 714 (FIG. 9 or FIG. 10) or select selection 910 (FIG. 9 or FIG. 10). For a determination of no partial serial number matches in step 1430, it may be determined in a step 1436 if software may be configured to present the found currency note to user for confirmation. For a determination of user being presented with a matching currency note for confirmation in step 1436, user may in a step 1438 be presented with the found currency note as illustrated by information display 700 (FIG. 7) and requested to confirm currency note. User may confirm currency note in a step 1440 by opting for select selection 714 (FIG. 7). Following confirmation for currency note in step 1440, a determination of user not confirming in step 1436 and selection of currency note in step 1434 and step 1428 (FIG. 14B), user may in a step 1442 be presented with information display 1100 (FIG. 11) and be requested to enter alphanumeric textual information in text input 1114 (FIG. 11). A determination for user being logged into an account may be determined in a step 1444 (FIG. 14D). For a determination of user not logged into an account in step 1444, user may in a step 1446 be presented with information display 1200 (FIG. 12A) and may be requested to make a selection for notification radio selection 1216 (FIG. 12A) of whether user desires to be notified for entry of a new record for the currency note or not, may be requested to enter a username in username input 1218 (FIG. 12A) and may be requested to enter an email address in email address input 1220 (FIG. 12A). A determination of user seeking to be notified of creation of a new entry for a currency note may be performed in a step 1448. For a determination of user selecting to be notified for entry of a new record in step 1448, user may in a step 1450 enter a username in username input 1218 (FIG. 12A) and an email address in email address input 1220 (FIG. 12A). Furthermore, user may select continue selection 1224 following input of information for information display 1200 (FIG. 12A) to continue to the next step. For a determination of user not selecting to be notified of a new record entry for the currency note in step 1448, a determination for a new currency note may then be performed in a step 1452. For a determination of a new currency note in step 1452, user may in step 1450 be presented information display 1200 (FIG. 12B) and may be required to enter a username in username input 1218 and an email address in email address input 1220. Furthermore, user may select continue selection 1224 to continue to the next step. Following user entering a username and email address in step 1450, a determination for user being previously registered may be performed in a step 1454 (FIG. 14E). For a determination of user not being previously registered, user may in a step 1456 register for an account. For a determination of user not being previously registered in step 1454, user may in a step 1458 be presented with information display 1200 (FIG. 12C) and be requested to enter a password in password input 1230 (FIG. 12C) followed by selecting continue selection 1224 (FIG. 12C). A determination for validity of information entered in step 1458 may be performed in a step 1460. For a determination of invalid information in step 1460, user may be requested to repeat entry of a password in step 1458. For a determination of valid information provided by user in step 1460, user may in a step 1462 be provided with access to the site. For a determination of user not seeking to track a currency note in step 1404 (FIG. 14A), user may in a step 1464 (FIG. 14F) be presented with conventional information display 100 (FIG. 1) and be requested to select a denomination with denomination selection input 104, select a bill series with bill series selection input 106, enter a serial number for currency note in serial number input 108, enter a zip code in zip code input 110, select whether user has possession of currency note with possession radio selection 112 and enter alphanumeric text information into text input 114. Furthermore, after making selections and entering information, user may select submit selection 116 to continue to the next step. A determination for user seeking to search for a currency note (instead of seeking to track a currency note as user originally intended in step 1404 (FIG. 14A)) may be performed in a step 1466 (FIG. 14F). This determination is made when a 'tracking' user attempts to enter a bill and the system finds a partial or exact match, the user becomes a 'searching' user and then is taken to step 1432 and given a list of potentially matching bills. In other words, a 'tracking' user is only allowed to enter new bills if no partial or exact matches are found. If a partial match is found, the 'tracking' user still has the option to proceed and enter the bill as originally entered, and it will be stored an initial entry, and the tests in steps 1452/1450 still apply (must be a registered user to make initial entries). For a determination of user seeking to search for a currency note in step 1466, operation of software transitions to step 1414 (FIG. 14B). For a determination of user seeking to track a currency note in step 1466 (FIG. 14F) (as opposed to seeking to search for a bill), a determination for validity of input information provided by user related to the currency note may be performed in a step 1468. For a valid determination in step 1468, user allowed access in step 1462 (FIG. 14E), a determination of user logged into an account in step 1444 (FIG. 14D) or for a determination of not a new currency note in step 1452 (FIG. 14D), a determination for data correctness for information entered with respect to the currency note may be performed in a step 1470 (FIG. 14G). For a determination of incorrect information provided in step 1470, user may in a step 1472 be displayed an error message followed by a transition of software execution to step 1402 (FIG. 14A). For a determination of correct information provided in step 1470 (FIG. 14G), a determination for alternate transaction may be performed in a step 1474. Non-limiting examples of alternate transactions include not qualifying as "natural circulation", not currently in possession and entry violated rules. For a determination of not an alternate transaction in step 1474, the entry may be denoted as a valid transaction in a step 1476. For a determination of an alternate transaction in step 1474, the entry may be flagged as an alternate transaction in a step 1478. In a step 1480, a bill tracking report information display 1300 may be presented to user as illustrated in FIG. 13. In a step 1482 (FIG. 14G), execution of software may be terminated.

Figure 15:
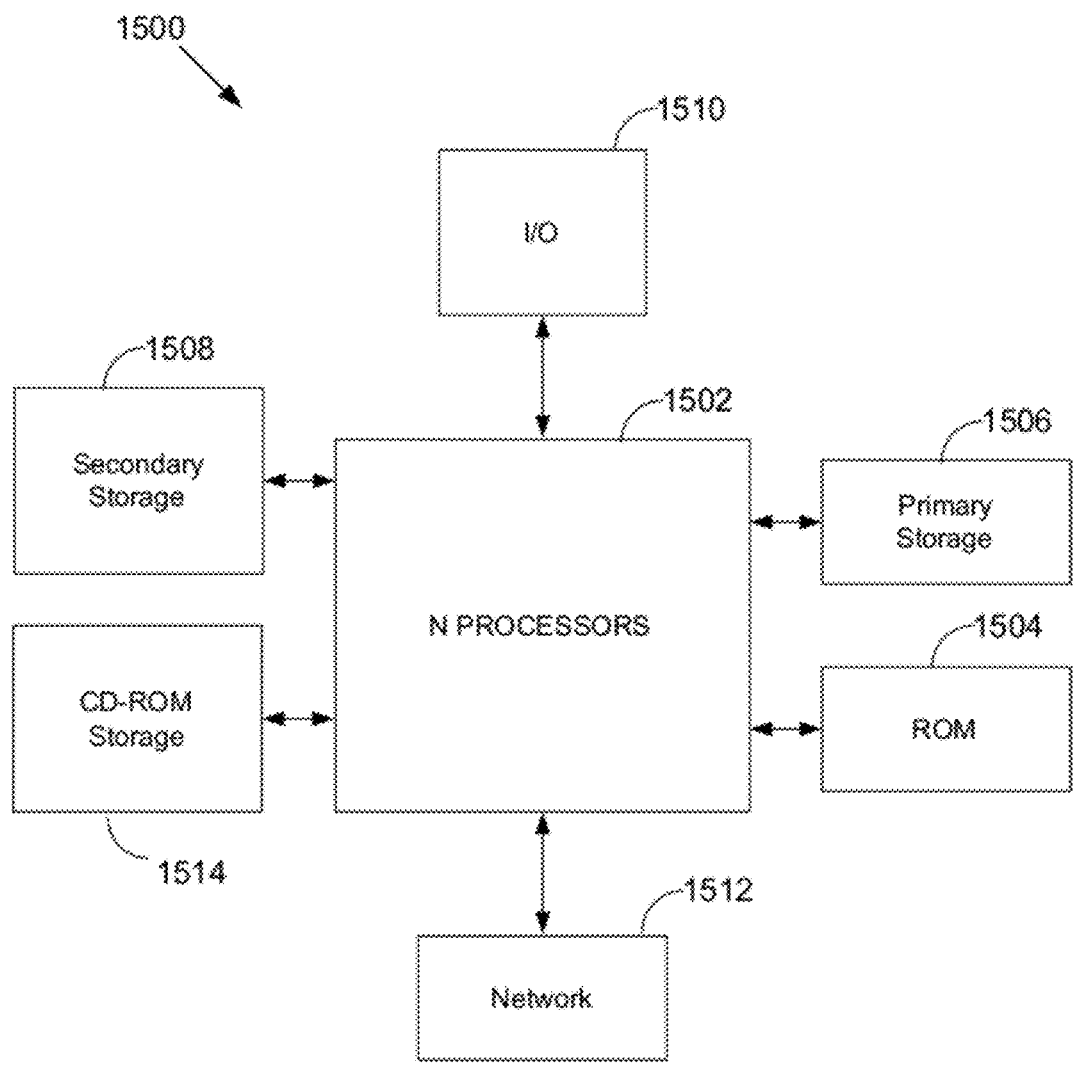
FIG. 15 illustrates a typical computer system that, when appropriately configured or designed, may serve as a computer system 1500 for which the present invention may be embodied.

FIG. 15 illustrates a typical computer system that, when appropriately configured or designed, may serve as a computer system 1500 for which the present invention may be embodied.

Computer system 1500 includes a quantity of processors 1502 (also referred to as central processing units, or CPUs) that may be coupled to storage devices including a primary storage 1506 (typically a random access memory, or RAM), a primary storage 1504 (typically a read only memory, or ROM). CPU 1502 may be of various types including microcontrollers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors. As is well known in the art, primary storage 1504 acts to transfer data and instructions uni-directionally to the CPU and primary storage 1506 typically may be used to transfer data and instructions in a bi-directional manner. The primary storage devices discussed previously may include any suitable computer-readable media such as those described above. A mass storage device 1508 may also be coupled bi-directionally to CPU 1502 and provides additional data storage capacity and may include any of the computer-readable media described above. Mass storage device 1508 may be used to store programs, data and the like and typically may be used as a secondary storage medium such as a hard disk. It will be appreciated that the information retained within mass storage device 1508, may, in appropriate cases, be incorporated in standard fashion as part of primary storage 1506 as virtual memory. A specific mass storage device such as a CD-ROM 1514 may also pass data uni-directionally to the CPU.

CPU 1502 may also be coupled to an interface 1510 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1502 optionally may be coupled to an external device such as a database or a computer or telecommunications or internet network using an external connection shown generally as a network 1512, which may be implemented as a hardwired or wireless communications link using suitable conventional technologies. With such a connection, the CPU might receive information from the network, or might output information to the network in the course of performing the method steps described in the teachings of the present invention.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing novel means for and/or steps described that the applications designer will selectively decide, depending upon the practical considerations of the particular implementation, to carry out and/or locate within the jurisdiction of the USA. For any claims construction of the following claims that are construed under 35 USC §112 (6) it is intended that the corresponding means for and/or steps for carrying out the claimed function also include those embodiments, and equivalents, as contemplated above that implement at least some novel aspects and objects of the present invention in the jurisdiction of the USA. For example, the functions provided by server devices 208 and 210 and global network 206 as illustrated in FIG. 2 and the operation of the example software embodiment as illustrated in FIG. 14A-G may be performed and/or located outside of the jurisdiction of the USA while the remaining method steps and/or system components of the forgoing embodiments are typically required to be located/performed in the US for practical considerations.

Having fully described at least one embodiment of the present invention, other equivalent or alternative methods of providing sovereign currency searching and tracking according to the present invention will be apparent to those skilled in the art. The invention has been described above by way of illustration, and the specific embodiments disclosed are not intended to limit the invention to the particular forms disclosed. For example, the particular implementation of the GUI may vary depending upon the particular type computer system used. The software execution and GUIs described in the foregoing were directed to networked client/server implementations; however, similar techniques may be provided by other types of devices such as, but not limited to, televisions, gaming systems, teller machines and navigation systems, mobile computing or communication devices, smartphones, tablet computers, etc. Implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A method of searching and tracking currency bills, the method comprising:
    determining whether a user seeks to search for a currency bill or whether the user seeks to track a currency bill;
    when the user seeks to track a currency bill:
        prompting the user to enter information comprising a serial number, location, and indication of possession of said currency bill;
        receiving a negative indication of possession of said currency bill;
        flagging the entered information as an alternate transaction, where the alternate transaction indicates lack of natural circulation; and
        displaying a bill tracking report wherein the currency bill is denoted as alternate;
    when the user seeks to search for a currency bill:
        prompting the user to enter information comprising a serial number, location, and indication of possession of said currency bill;
        receiving a negative indication of possession of said currency bill;
        flagging the entered information as an alternate transaction, where the alternate transaction indicates lack of natural circulation;
        performing a partial matching search using the entered serial number, where one or more matching currency bills are returned and presented to the user for selection;
        receiving selection of a matching currency bill from the user; and
        displaying a bill tracking report wherein the currency bill is denoted as alternate.

2. The method of claim 1, wherein the user selects to be notified when a new entry has been entered for said currency bill.

3. The method of claim 1, wherein the entered serial number contains mistaken alpha characters "C" or "G"; and
    prompting the user with a list of potentially matching currency bills corresponding to mistaken alpha characters "C" or "G".

4. The method of claim 1, further comprising:
    displaying signatures of potentially matching currency bills.

5. The method of claim 1, further comprising prompting a user to enter denomination and series of said currency bill.

6. The method of claim 1, wherein said location comprises a postal code.

7. The method of claim 1, further comprising:
    prompting the user to enter a date of possession.

8. A system for searching and tracking currency bills, the system comprising:
    a computer system comprising at least one processor;
    means for determining whether a user seeks to search for a currency bill or whether the user seeks to track a currency bill;
    when the user seeks to track a currency bill:
        means for prompting the user to enter information comprising a serial number, location, and indication of possession of said currency bill;
        means for receiving a negative indication of possession of said currency bill;
        means for flagging the entered information as an alternate transaction, where the alternate transaction indicates lack of natural circulation; and
        means for displaying a bill tracking report wherein the currency bill is denoted as alternate;
    when the user seeks to search for a currency bill:
        means for prompting the user to enter information comprising a serial number, location, and indication of possession of said currency bill;
        means for receiving a negative indication of possession of said currency bill;
        means for flagging the entered information as an alternate transaction, where the alternate transaction indicates lack of natural circulation;
        means for performing a partial matching search using the entered serial number, where one or more matching currency bills are returned and presented to the user for selection;
        means for receiving selection of a matching currency bill from the user; and
        means for displaying a bill tracking report wherein the currency bill is denoted as alternate.

9. The system of claim 8, further comprising means for notifying a user when a new entry has been entered for said currency bill.

10. The system of claim 8, wherein the entered serial number contains mistaken alpha characters "C" or "G"; and
    means for prompting the user with a list of potentially matching currency bills corresponding to mistaken alpha characters "C" or "G".

11. The system of claim 8, further comprising:
    means for displaying signatures of potentially matching currency bills.

12. The system of claim 8, further comprising means for prompting a user to enter denomination and series of said currency bill.

13. The system of claim 8, wherein said location comprises a postal code.

14. The system of claim 8, further comprising means for prompting the user to enter a date of possession.

15. A non-transitory computer-readable storage medium storing instructions thereon that when executed by a processor cause the processor to perform steps for searching and tracking currency bills comprising:
determining whether a user seeks to search for a currency bill or whether the user seeks to track a currency bill;
when the user seeks to track a currency bill:
prompting the user to enter information comprising a serial number, location, and indication of possession of said currency bill;
receiving a negative indication of possession of said currency bill;
flagging the entered information as an alternate transaction, where the alternate transaction indicates lack of natural circulation; and
displaying a bill tracking report wherein the currency bill is denoted as alternate;
when the user seeks to search for a currency bill:
prompting the user to enter information comprising a serial number, location, and indication of possession of said currency bill;
receiving a negative indication of possession of said currency bill;
flagging the entered information as an alternate transaction, where the alternate transaction indicates lack of natural circulation;
performing a partial matching search using the entered serial number, where one or more matching currency bills are returned and presented to the user for selection;
receiving selection of a matching currency bill from the user; and
displaying a bill tracking report wherein the currency bill is denoted as alternate.

16. The non-transitory computer-readable storage medium of claim 15, wherein the user selects to be notified when a new entry has been entered for said currency bill.

17. The non-transitory computer-readable medium of claim 15, wherein the entered serial number contains mistaken alpha characters "C" or "G"; and
prompting the user with a list of potentially matching currency bills corresponding to mistaken alpha characters "C" or "G".

18. The non-transitory computer-readable medium of claim 15, further comprising:
displaying signatures of potentially matching currency bills.

19. The non-transitory computer-readable medium of claim 15, further comprising prompting a user to enter denomination and series of said currency bill.

20. The non-transitory computer-readable storage medium of claim 15, wherein said location comprises a postal code.

21. The non-transitory computer-readable storage medium of claim 15, further comprising:
prompting the user to enter a date of possession.

* * * * *